United States Patent
Tezuka et al.

(10) Patent No.: US 7,010,615 B1
(45) Date of Patent: Mar. 7, 2006

(54) COMMUNICATION NETWORK MANAGEMENT SYSTEM FOR AUTOMATICALLY CONVERTING ACTION PARAMETERS TO NETWORK TECHNOLOGY DEPENDENT PARAMETERS USING A SELECTED CONVERSION RULE CONFORMING TO A NETWORK TECHNOLOGY

(75) Inventors: Koji Tezuka, Kawasaki (JP); Takao Ogura, Kawasaki (JP); Kohei Iseda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 563 days.

(21) Appl. No.: 09/666,485

(22) Filed: Sep. 20, 2000

(30) Foreign Application Priority Data

Nov. 12, 1999 (JP) ................................. 11-322015

(51) Int. Cl.
  *G06F 15/16* (2006.01)
(52) U.S. Cl. ....................... 709/246; 709/224; 709/249
(58) Field of Classification Search ................ 709/202, 709/223–224, 249–250, 246
See application file for complete search history.

(56) References Cited

U.S. PATENT DOCUMENTS

| 6,304,892 | B1 * | 10/2001 | Bhoj et al. ................... 709/202 |
| 6,370,587 | B1 * | 4/2002 | Hasegawa et al. ........... 709/245 |
| 6,374,293 | B1 * | 4/2002 | Dev et al. .................... 709/220 |
| 6,393,473 | B1 * | 5/2002 | Chu ............................ 709/223 |
| 6,400,689 | B1 * | 6/2002 | Sato et al. ................... 370/242 |
| 6,401,117 | B1 * | 6/2002 | Narad et al. ................. 709/223 |
| 6,463,470 | B1 * | 10/2002 | Mohaban et al. ............ 709/223 |
| 6,539,425 | B1 * | 3/2003 | Stevens et al. .............. 709/220 |
| 6,539,432 | B1 * | 3/2003 | Taguchi et al. .............. 709/227 |
| 6,584,502 | B1 * | 6/2003 | Natarajan et al. ........... 709/224 |
| 2003/0018760 | A1 * | 1/2003 | Putzolu et al. ............... 709/223 |
| 2003/0018783 | A1 * | 1/2003 | Bos et al. .................... 709/226 |
| 2003/0115246 | A1 * | 6/2003 | Mahon et al. ............... 709/200 |

FOREIGN PATENT DOCUMENTS

JP 2001036587 A * 2/2001

OTHER PUBLICATIONS

Yuji Nomura et al., "A Study on Policy-Based Dynamic QoS Configuration," Shingaku Ghio (Technical Report of IEICE), Jan. 22, 1999, p. 69. IN98-150, Japan.

Masahiko Honda et al., "Consideration of Policy Server Constitution," General Conference of Institute of Electronics, Information and Communication Engineers, Mar. 28, 1999, p. 197, 99-Spring-2-B-7-88, Japan.

* cited by examiner

*Primary Examiner*—Zarni Maung
*Assistant Examiner*—Oanh Duong
(74) *Attorney, Agent, or Firm*—Katten Muchin Rosenman LLP

(57) ABSTRACT

Disclosed is a communication network management system for converting action parameters contained in abstract requirements (abstract policy information) regarding a network to parameters conforming to the network technology (ATM, SDH, WDM, etc.) and type of network element to be set, and setting these parameters in the element. Specifically, a policy administration portion converts action parameters contained in abstract policy information to parameters dependent upon network technology and a policy enforcement portion converts the parameters obtained by this conversion to parameters dependent upon type of network element to be set and sets these parameters in the element.

7 Claims, 19 Drawing Sheets

FIG. 8A
<From: TPa To: TPz,
FromTime: 9 ToTime: 18,
maxRate: 10Mbps minRate: 3Mbps
monitor: continuityMonitor
Protection: Duplex —(a)

FIG. 8B
maximumRate: 10Mbps minimumRate: 3Mbps
monitor: continuityMonitor
protection: Duplex —(b)

FIG. 8C
Maximum Rate: 10Mbps MinimumRate: 3Mbps —(c)

FIG. 8D
monitor: continuityMonitor —(d)

FIG. 8E
<Protection: Duplex> —(e)

FIG. 8F
ServiceCategory: GFR
peakCellRate: 26Kcell/sec
minmumCellRate: 8Kcell/s —(f)

FIG. 8G
TestCategory: VCcharacteristicTest
oamCellRate: 20cell/sec
Mode:In-service> —(g)

FIG. 8H
protectionCategory: VPprotection
paiGropeNumber: 10 —(h)

FIG. 8I
ACTION COMMAND —(i)
OPERATION: createTP action
INPUTPARAMETERS:
targetID: vcTP_ID
ServiceCategory: GFR
peakCellRate: 26K
minimumCellRate: 8K

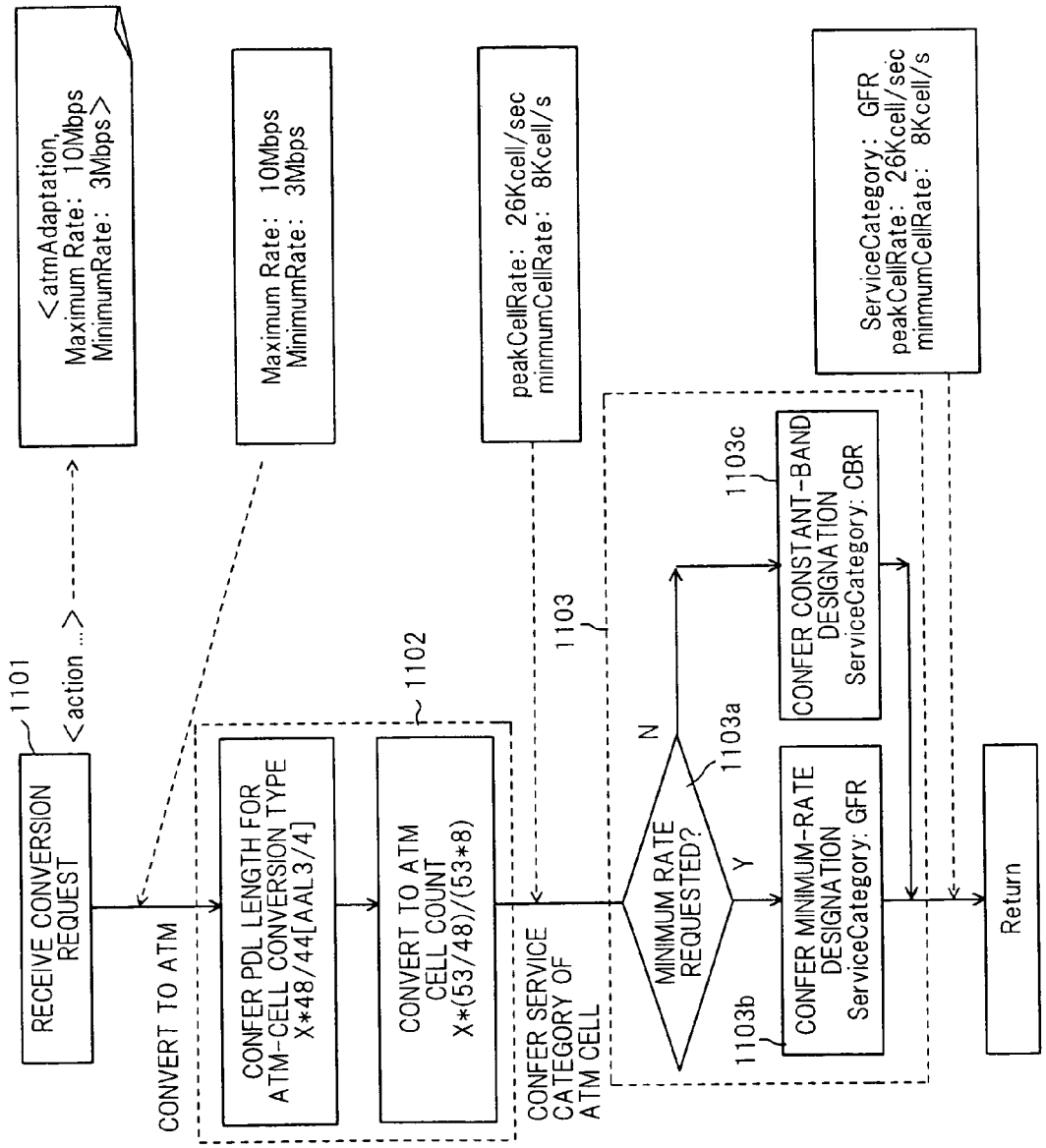

FIG. 11A

TestCategory: VCcharacteristicTest
oamCellRate: 20cell/sec
Mode: In-service>

FIG. 11B

TestCategory: SDH PathTrace

FIG. 11C protectionCategory: VPprotection
pairGroupNumber: 10

FIG. 11D protectionCategory: SDHprotection

ACTION COMMAND (a) — INFORMATION CONCERNING OBJECT TO BE SET / INFORMATION CONCERNING FUNCTION (b)

(c)

(d)

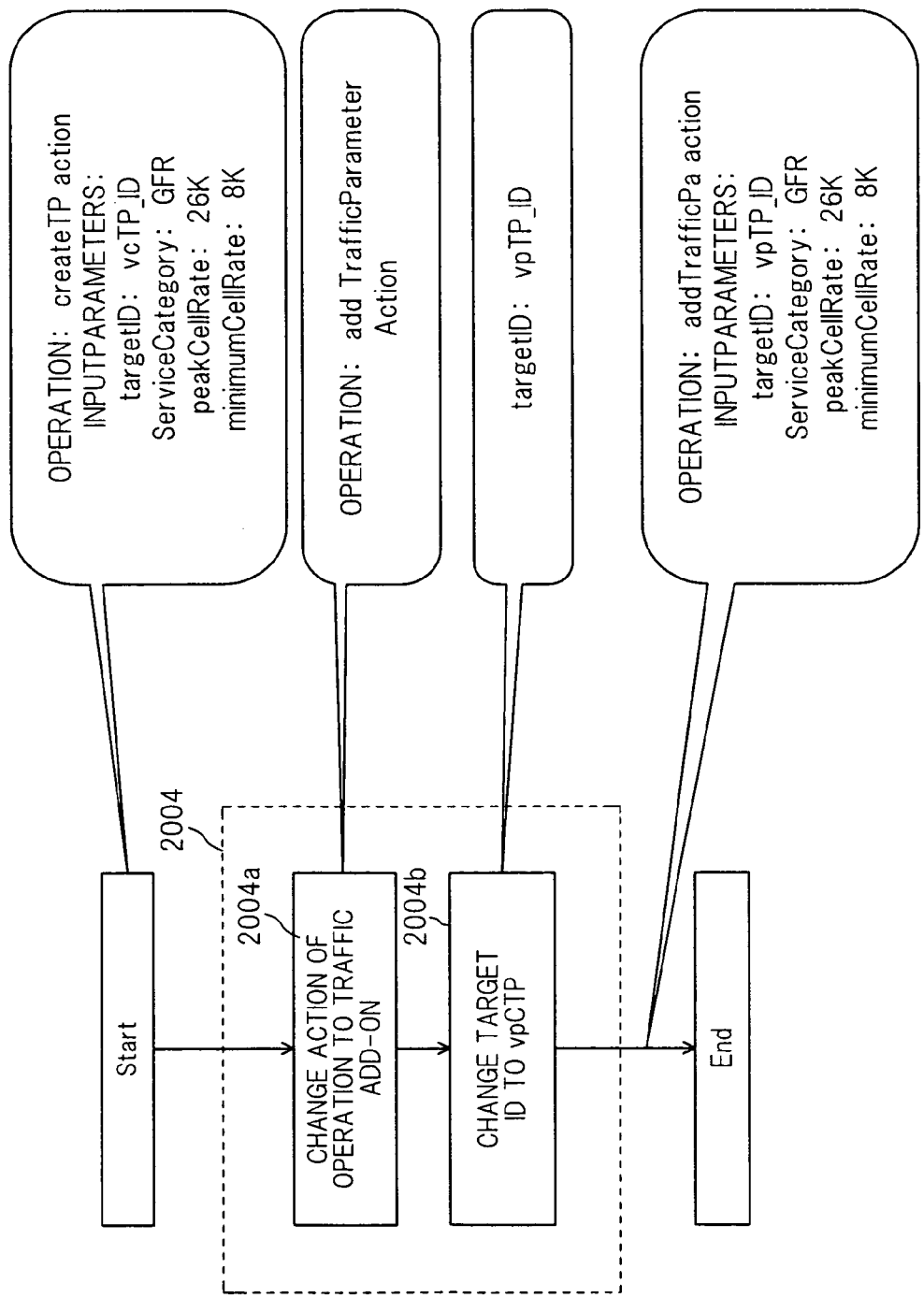

COMMUNICATION NETWORK MANAGEMENT SYSTEM FOR AUTOMATICALLY CONVERTING ACTION PARAMETERS TO NETWORK TECHNOLOGY DEPENDENT PARAMETERS USING A SELECTED CONVERSION RULE CONFORMING TO A NETWORK TECHNOLOGY

BACKGROUND OF THE INVENTION

This invention relates to a communication network management system and, more particularly, to a communication network management system for managing and operating a network in accordance with a business policy or user policy.

Communication networks employ a variety of network technologies, e.g., SDH, ATM, FR, WDM and IP. In addition, communication networks are becoming increasingly more complicated in form and are divided into a wide variety of domains (subnetworks) as in the manner of access networks, backbone networks, SDH (Synchronous Digital Hierarchy) networks and WDM (Wavelength Division Multiplexing) networks. These domains are managed by an EMS (Element Management System) and these are in turn managed by an NMS (Network Management System). The NMS and EMS both have a manager/agent architecture defined by the ISO. The NMS transmits an operating command to a manager agent within the EMS using a prescribed management protocol, e.g. the CMIP (Common Management Information Protocol), and the status of a domain is acquired by the EMS to thereby manage the overall network.

FIG. 16 is a diagram useful in describing a system management model and illustrates the relationship between a manager/agent architecture and the CMIP and managed objects (MO). A manager M operates managed objects MO, which are managed by an MIB (Management Information Base) within an agent A.

More specifically, the managed objects MO are obtained by using an object-oriented technique to model a network resource such as a line, switch, multiplexer and virtual communication path in the domain to be managed. A variety of status variables possessed by the network resource are referred to as the attributes possessed by the managed objects MO. Network management is for operating these managed objects MO. Operations include the following:
 (1) creation of a managed object MO (M-CREATE);
 (2) deletion of a managed object MO (M-DELETE);
 (3) reading of an attribute of a managed object MO (attribute acquisition) (M-GET);
 (4) setting or changing of an attribute of a managed object MO (M-SET);
 (5) implementation of a function possessed by the managed object MO (M-ACTION); and
 (6) receiving an event report from a managed object MO (M-EVENT-REPORT).

Though the manager M is a mechanism which plays the main role in network management, it does not directly operate a managed object MO; it is an agent A that operates the managed objects MO. For this reason, the manager M uses the management protocol CMIP to send an operating command to the agent A, thereby operating the network indirectly to implement management. It is possible with this management operation to adopt a plurality of managed objects MO as objects of control simultaneously by a single management operation.

FIG. 17 is an explanatory view illustrating the concept of a basic network hierarchy in network management. In accordance with a TMN (Telecommunication Management Network) defined by the ITU-TM.3000 series, network management functions are classified into the following four layers and the roles thereof are clarified:
 (1) element management layer EML;
 (2) network management layer NML;
 (3) service management layer SML; and
 (4) business management layer BML (not shown).

Element management systems (EMS) 11, 12 are each connected to one or more network elements (NE) 1~4 within corresponding domains and control the managed objects MO to manage the network elements NE and the domains (subnetworks SN) constituted by the network elements. A network management system (NMS) 21 is connected to one or a plurality of element management systems (EMS) 11, 12 and manages the network elements of the overall network via these element management systems.

A service management system (SMS) 31 is connected to the network management system (NMS) 21 and, in accordance with a command from a user interface (user terminal) 32, requests the network management system (NMS) 21 for prescribed network information, receives this network information and outputs the same. Further, a user terminal 22 requests the network management system (NMS) 21 directly for prescribed network information, receives this information and displays the information on a display unit or prints out the information using a printer.

FIG. 18 illustrates an example of the configuration of a communication network. Here a plurality of element management systems EMS are provided for corresponding ones of domains (subnetworks SN1~SN4). A network management system NMS is connected to each of the element management systems EMS and manages the network via these element management systems EMS. The subnetworks SN1, SN4 are access networks implemented in the ATM (Asynchronous Transfer Mode), the subnetwork SN3 is a core network implemented by SDH, and the subnetwork SN2 is a core network (SDH) implemented by WDM. IP connection points IPC1, IPC2 are points of connection to an IP network (not shown), which is a business network.

FIG. 19 is a diagram useful in describing the relationship among systems. This diagram illustrates the relationship among the systems of FIG. 17 taking into consideration the manager/agent architecture shown in FIG. 16. Here M represents a manager, A an agent, MO a managed object, APL an application and MIB a management information base. The higher and lower layers have a manager M—agent A relationship, and communication is performed via the management protocol CMIP.

The network management system (NMS) 21 stores the managed object MO, which is for managing network information that connects the domains, in the management information base MIB and functions as the agent A, which supplies network information to the service management system (SMS) 31. Further, the network management system (NMS) 21 behaves as the manager M with respect to the element management systems (EMS) 11, 12 and implements network management by operating the managed object MO, which has been stored in the management information base MIB, via the agent function of the element management systems (EMS) 11, 12. Further, through use of the user interface function, the network management system (NMS) 21 makes it possible to command the manipulation of network information.

The element management systems (EMS) 11, 12 store the managed objects MO for managing the domains in the management information bases MIB and function as agents A for supplying network information to the network management system (NMS) 21 of the higher layer. Further, the element management systems (EMS) 11, 12 behave as the managers M with respect to the network elements (NE) 1, 2, and perform network management within a specified range by operating the managed objects MO, which have been stored in the management information bases MIB, via the agent functions of the network elements 1, 2, . . .

In order to exploit network resources effectively, there is now need for a system which can implement network management in accordance with a business network operations policy. Conventionally, public networks which provide leased lines to businesses furnish network services of uniform high reliability and quality in compliance with the wishes of users. Recently, however, there has been growing demand for a network service which, in accordance with business policy, makes it possible to designate the quality of a public network, or to change the quality thereof dynamically, in conformity with the network quality desired by individual users. To satisfy this demand, a service has been made available in which a Service Level Agreement (SLA) is concluded between a public network and a user and the public network adjusts the user network quality on the basis of the SLA.

Practical public networks are implemented using various network technologies adapted to the traffic characteristics of users, namely network technologies such as IP, FR (Frame Relay), SDH and ATM (see FIG. 18). In such networks, it becomes necessary to change the SLA dynamically if user traffic changes or increases in an IP network, by way of example. In accordance with the agreement with the user, therefore, it is necessary to convert the SLA information to the parameters of the network (IP, FR, SDH, ATM, etc.) being used in the public network.

Communication traffic through a plurality of domains (subnetworks) is dependent upon the QoS (Quality of Service) of the traversed domains. For this reason, there are cases where QoS requirements cannot be satisfied fully depending upon applications where quality is important, such as TV conference and voice applications, real-time applications, etc. In order to satisfy QoS requirements using these applications, it is necessary to request end-to-end quality, select end-to-end domains (subnetworks) that can provide the demanded quality assurance and carry out QoS policy provisioning. Here "provisioning" means establishing paths and networks. With QoS policy provisioning, it is necessary to convert SLA information, e.g., maximum and minimum end-to-end speeds required by the user, to parameters (cell rate in case of ATM and containers in case of SDH) conforming to the network technology (IP, FR, SDH, ATM, etc.).

With regard to SLA heretofore, general agreements such as guarantees of usable time (availability) have already been introduced. However, it is required that parameters dependent upon a specific network technology such as IP, FR, SDH or ATM be set in a data format that is dependent upon the network technology by the information system administrator of the business. It is necessary, therefore, to have an understanding of the networks on both the company and public-network sides. This means that one must have the know-how to deduce specific parameters conforming to the network from the abstract requirements of the user, and hence obstacles are confronted when making changes dynamically. For example, deducing the parameters of the network takes time. In addition, management of a public network also requires a maintenance man who knows how to ascertain the actual status of the network.

SUMMARY OF THE INVENTION

Accordingly, an object of the present invention is to so arrange it that abstract user requirements concerning a network, i.e., abstract policy information, from the user of the network can be converted automatically to parameters that conform to the network technology (this being referred to as "policy detailing").

Another object of the present invention is to make it possible to reduce the know-how and learning necessary for network settings and to speed up and simplify network settings on the user side, and to make it possible to shorten the time necessary to change to a new service on the side of the public network, as a result of which the cost of changing a network configuration is reduced.

A network system in accordance with the present invention has (1) first conversion means for converting action parameters, which are contained in policy information obtained by abstracting a network-related user requirements, to network-technology-dependent parameters, and (2) second conversion means for converting the network-technology-dependent parameters, which have been obtained by the conversion by the first conversion means, to parameters dependent upon a network element that has been specified by a target parameter contained in policy information.

The first conversion means has (1) policy disassembling means for disassembling the abstracted policy information, extracting action parameters and outputting the same; (2) storage means for storing conversion rules used when the action parameters are converted to network-technology-dependent parameters; and (3) conversion means for selecting a conversion rule conforming to a network technology and converting action parameters to network-technology-dependent parameters using the selected conversion rule.

The second conversion means has (1) policy enforcement means for receiving network-technology-dependent parameters from a policy administration portion serving as the first conversion means, and setting, in a network element, element-dependent parameters obtained by converting the network-technology-dependent parameters; storage means for storing conversion rules used when the network-technology-dependent parameters are converted to element-dependent parameters; and (3) conversion means for selecting a conversion rule conforming to element type and converting the network-technology-dependent parameters to element-dependent parameters using the selected conversion rule.

With regard to the first conversion means, the conversion-rule storage means provides conversion rules classified by network technology, and the conversion means selects a conversion rule based upon a network technology and converts the action parameters to network-technology-dependent parameters using the selected conversion rule.

Further, the conversion-rule storage means stores the following as conversion rules for converting the action parameters to network-technology-dependent parameters: (1) a first parameter conversion rule relating to adaptation, (2) a second parameter conversion rule relating to monitoring, and (3) a third parameter conversion rule relating to protection; the policy disassembling means disassembles action parameters into (1) a parameter relating to adaptation, (2) a parameter relating to monitoring and (3) a parameter relating to protection; and the conversion means makes the conversion to the network-technology-dependent parameters using the first to third parameter conversion rules.

The first conversion means is further provided with policy storing means for storing policies (network-technology-dependent parameters) obtained by conversion, wherein a policy conforming to new action parameters is acquired from the policy storing means.

With regard to the second conversion means, the conversion-rule storage means stores conversion rules, selects a prescribed conversion rule based upon element type and converts the network-technology-dependent parameters to element-dependent parameters using the selected conversion rule.

Further, with regard to the second conversion means, the conversion-rule storage means adds on and stores a conversion rule whenever an element function is added on or changed, and the conversion means selects a prescribed conversion rule upon taking the function of a network element or the number of versions of a network element into consideration and converts the network-technology-dependent parameters to the element-dependent parameters using the selected conversion rule.

In accordance with the arrangement described above, network-related abstract requirements from a user, namely abstract policy information, can be converted to network-technology-dependent parameters automatically. Further by performing this policy detailing automatically, know-how and learning necessary for network settings can be reduced and network settings can be speeded up and simplified on the user side, and the time necessary to change to a new service can be shortened on the side of the public network, thereby making it possible to reduce the cost of changing a network configuration.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIGS. 8A to 8I are diagrams useful in describing data in various parts of the operation flowchart of the PAF;

FIG. 9 is a processing flowchart (in the case of an ATM) of an action conversion rule of the PAF;

FIGS. 11A to 11D show examples of a conversion of a monitor request and duplexing request in ATM and SDH;

FIG. 14 is a processing flowchart of a conversion rule for changing an object to be set;

DESCRIPTION OF THE PREFERRED EMBODIMENT (A) Configuration of Communication Network Management System FIG. 1 is a block diagram illustrating the configuration of a communication network management system according to the present invention, and FIG. 2 is a diagram useful in describing the generation of a QoS capability view and QoS policy provisioning in this network management system according to the present invention. Here QoS is the abbreviation of Quality of Service.

Figure 1:
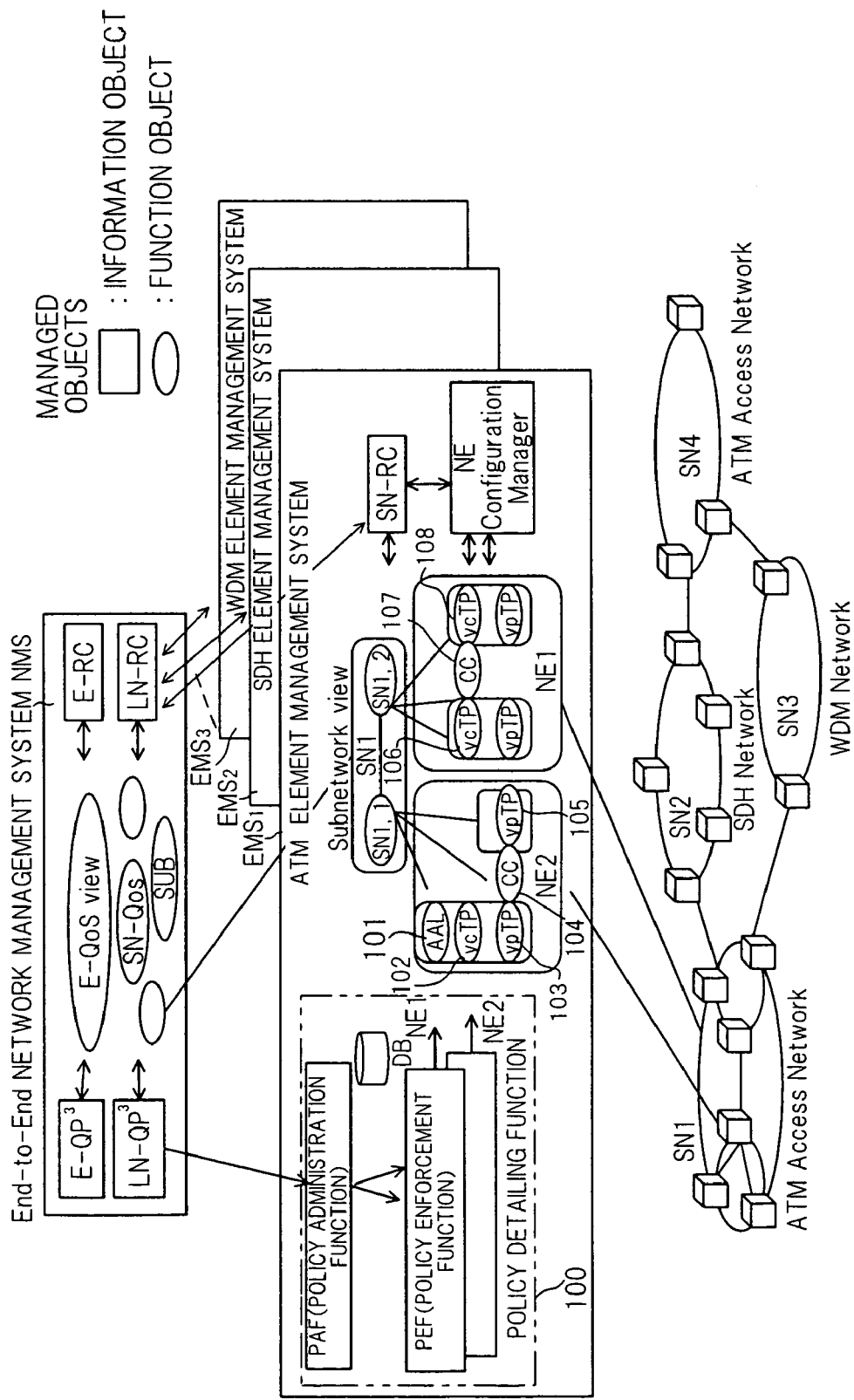
FIG. 1 is a block diagram illustrating the configuration of a communication network management system according to the present invention.

The network management system NMS which performs end-to-end network management is connected to a plurality of element management systems EMSi (i=1, 2, 3, . . . ). Since network technologies such as ATM, SDH, WDM and IP have functions that differ from one another, =1 an element management system EMSi is provided for each network technology. Since subnetworks SN1~SN4 for ATM, WDM and SDH are mixed together, the network shown in FIG. 1 is provided with (1) an ATM element management system EMS1, (2) an SDH element management system EMS2 and (3) a WDM element management system EMS3 as the element management systems. The ATM element management system EMS1 manages the subnetworks SN1, SN4, the SDH element management system EMS2 manages the subnetwork SN2 and the WDM element management system EMS3 manages the subnetwork SN3. The network management system NMS and the element management systems EMS1~EMS3 have a manager—agent relationship.

Since the network management system NMS performs end-to-end network management, it manages each domain and performs layer management between network technologies. Further, the network management system NMS executes a QoS policy by collecting and giving notification of network information, which contains QoS information, from each of the element management systems EMS1~EMS3. Managed objects in the network management system NMS are constituted by (1) function objects (E-RC, LN-RC, E-QP3, LN-QP3) for exercising network control and (2) information objects [TP (termination points), SN (subnetworks), E-QOS view, SN-QOS, etc.)]. The information objects are present in layer units (ATM, SDH, WDM layers, etc.).

The element management systems EMSi (i=1, 2, 3, . . . ) are provided for respective ones of the network technologies, as mentioned earlier, manage the domains and elements and report subnetwork information to the network management system NMS, which is the higher layer. Managed objects in an element management system EMSi are constituted by (1) function objects (SN-RC, NE-configuration manager) which exercise control of the subnetworks and (2) information objects (NE1, NE2, SN-view, etc.) for managing network information, etc. In one example, the element management system EMS1 manages the subnetworks SN1 and SN2. Here are illustrated information objects NE1, NE2 and SN-view in a case where a path which satisfies a prescribed QoS condition is established between the network elements NE1 and NE2 of the subnetwork SN1. The information object NE2 (1) converts the internet protocol IP of a business network (IP network) to the ATM protocol of a public network using an AAL (ATM adaptation layer) unit 101, (2) establishes ATM VC traffic in a vcTP (virtual channel termination point) 102, (3) accommodates (multiplexes) several ATM VC traffics on the same VP in a vpTP (virtual path termination point) unit 103, and (4) using a cc (cross-connection) unit 104, cross connects the multiplexed VP traffic and transmits the result via a vpTP unit 105. The information object NE1 (1) demultiplexes the VC traffic, which has been multiplexed on the same VP, by a vcTP unit 106, (2) cross connects the demultiplexed VC traffic using a cc unit 107, and (3) transmits the result via a vcTP unit 108.

Further, the element management system EMS1 is provided with a policy detailing function portion 100. The latter receives abstracted network-technology-independent policy information from the network management system NMS, extracts operation parameters (action parameters) from the abstracted policy information, converts the operation parameters to network-technology-dependent and element-dependent parameters and sets these parameters in the network elements. The policy detailing function portion 100 has a policy administration function portion PAF and a policy enforcement function portion PEF. The policy administration function PAF converts operation parameters contained in the abstracted policy information to network-technology-dependent parameters, and the policy enforcement function PEF converts the network-technology-dependent parameters obtained by the above-mentioned conversion to parameters dependent upon element type (i.e., element-dependent parameters) and sets these parameters in the element. One policy administration function PAF is provided and shared by network technologies. Policy enforcement functions PEF are provided for corresponding ones of the network technologies.

Figure 2:
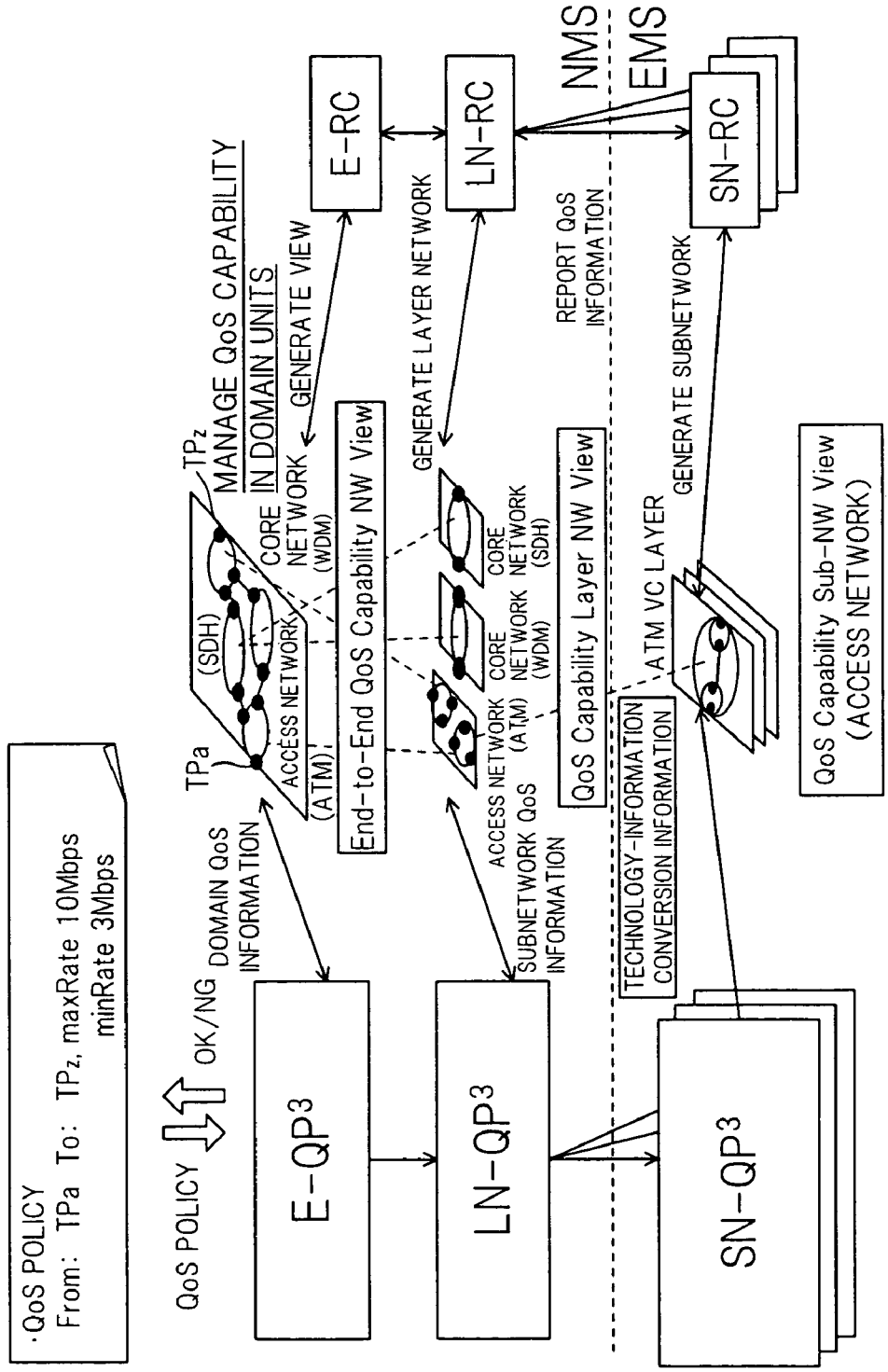
FIG. 2 is a diagram useful in describing the generation of a QoS capability view and QoS policy provisioning.

An SN-RC (Subnetwork Resource Configurator) provided in each element management system EMSi and an LN-RC (Layer Network Resource Configurator) and E-RC (End-to-end network Resource Configurator) provided in the network management system NMS each generate a QoS capability view for managing QoS capability (i.e., for managing a path that satisfies the QoS requirement) (see FIG. 2).

The SN-RC generates a QoS capability subnetwork view of each domain. The LN-RC generates a QoS capability layer network view in layer-network units (ATM layer, WDM layer, SDH layer, etc). That is, the LN-RC acquires network information from the SN-RC of the element management system EMSi and generates a QoS capability layer network view (a set of QoS capability subnetwork views of each layer) in layer-network units. The E-RC generates an end-to-end QoS capability view in which multiple technologies are placed in one view. That is, the E-RC generates an end-to-end QoS capability view obtained by connecting a plurality of QoS capability subnetwork views that exist end to end. In FIG. 2, an end-to-end QoS capability view between terminals TPa, TPz is illustrated.

When the configuration of a network is changed, as by adding on or removing elements, it is necessary to change the QoS capability view. To accomplish this, the network management system NMS and element management system EMSi are provided with a $QP^3$ (QoS Policy Provisioning Performer).

An $E-QP^3$ (End-to-end QoS Policy Provisioning Performer) provided in the network management system NMS selects a plurality of domains (subnetworks) which construct an end-to-end connection that satisfies the QoS policy requested by the user. A QoS policy is information (abstracted QoS policy information) for specifying end-to-end QoS (Quality of Service) in a format that is independent of network technology. A QoS policy requesting a maximum speed of 10 Mbps and a minimum speed of 3 Mbps between the terminals TPa, TPz is given in the following format:

From:TPA To:TPz, maxRate: 10 Mbps minRate: 3 Mbps

If a plurality of subnetworks exist in the same layer, an $LN-QP^3$ (Layer Network QoS Policy Provisioning Performer) performs selection of domains (subnetworks) that satisfy the QoS policy requested by the user. This is performed through a method similar to the domain selection of the $E-QP^3$.

An $SN-QP^3$ (Subnetwork QoS Policy Provisioning Performer) provided in the element management system EMSi performs QoS policy provisioning in subnetworks that have been selected by the $E-QP^3$ and $LN-QP^3$. In other words, the $SN-QP^3$ sets up a path that satisfies the QoS policy. The $SN-QP^3$ is a function contained in the policy detailing function 100 (policy administration function PAF and policy enforcement function PEF) shown in FIG. 1.

Element setting (QoS policy provisioning) based upon a QoS policy requested by the user is carried out in the manner described below.

The user enters a QoS policy for specifying an end-to-end QoS in a format independent of the network technology.

The $E-QP^3$, $LN-QP^3$ of the network management system select one or more domains (subnetworks) which construct an end-to-end connection that satisfies a QoS policy requested by the user and deliver the domain specifying information and QoS policy information to the policy administration function PAF of each element management system EMSi (i=1, 2, ... ).

Using a conversion rule conforming to the network technology of a domain indicated by the domain specifying information received from the network management system NMS, the policy administration function PAF of each element management system EMSi converts the received QoS policy to an operation command that is dependent upon the network technology (a technology-dependent parameter) and delivers this technology-dependent parameter to the policy enforcement function PEF corresponding to this domain.

Using a conversion rule conforming to the type of network element to be set, the policy enforcement function PEF converts an action command (which contains a technology-dependent parameter) received from the policy administration function PAF to an element-dependent parameter and sets this parameter in the element. In order to set an element-dependent parameter in a network element that is to be set, the attribute of a managed object MO that conforms to the network element managed by the element management system EMSi is changed by the element-dependent parameter and the NE-configuration manager sets the changed attribute in the actual network element that is to be changed.

Figure 3:
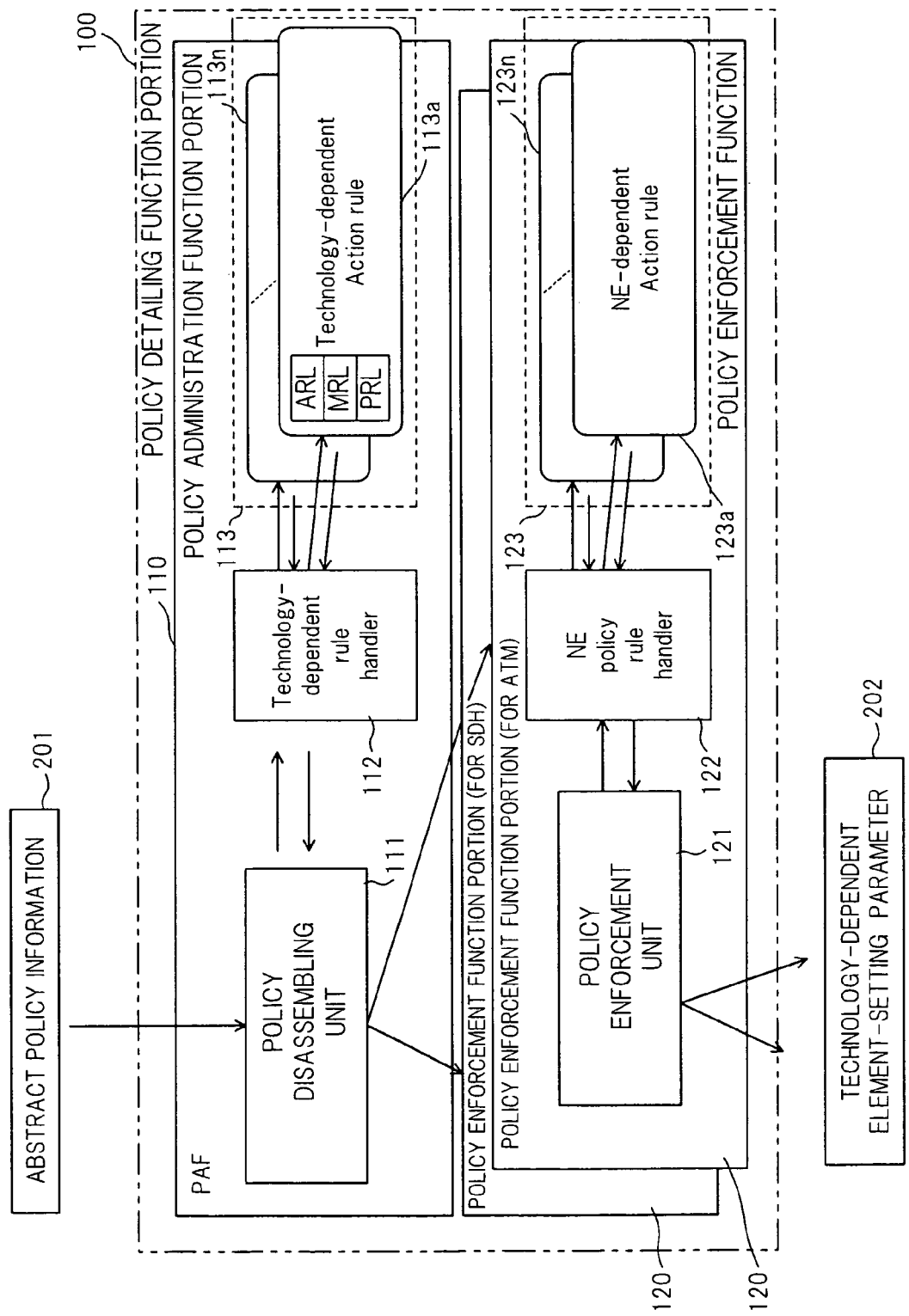
FIG. 3 is a block diagram illustrating the construction of a policy detailing function according to the present invention.

(B) Policy Detailing Function
(a) Construction of Policy Detailing Function
FIG. 3 is a block diagram showing the construction of the policy detailing function 100.

The policy detailing function 100 is provided within the prescribed element management system EMS1, generates a parameter 202 dependent upon the network technology and network element to be set from abstracted policy information 201 provided by the network management system NMS and sets the parameter 202 in the network element. The abstracted policy information 201 is information that is not dependent upon network technology and has information such as (1) a target (setting point of the public network), (2) a condition (date and time of operation) and (3) an action (details of operation).

The policy detailing function 100 has a policy administration function PAF 110 for converting a network-independent action parameter contained in the abstracted policy information 201 to a network technology-dependent parameter, and a policy enforcement function PEF 120 for converting a technology-dependent parameter obtained by the above-mentioned conversion to a parameter (element-dependent parameter) 202 that is dependent upon the network element specified by the target information. A single common policy administration function PAF is provided for each network technology but policy enforcement functions PEF are provided for corresponding ones of the network technologies.

(b) Policy administration function PAF

The policy administration function PAF has (1) a policy disassembling unit 111, (2) a technology-dependent rule handler 112, and (3) a storage unit 113 for storing a number of conversion rules 113a~113n for respective network technology for converting action parameters to technology-dependent parameters.

The policy disassembling unit 111 receives abstracted policy information 201 domain-by-domain from the network management system NMS, disassembles the abstracted policy information 201, extracts an action parameter, attaches network-technology identification data to the action parameter and inputs the action parameter to the technology-dependent rule handler 112. If an action parameter is input thereto, the technology-dependent rule handler 112 selects a conversion rule conforming to the network technology, converts the action parameter to a parameter (technology-dependent parameter) that is dependent upon network technology in accordance with the selected conversion rule, and inputs the parameter obtained to the policy disassembling unit 111. The latter distributes the technology-dependent parameter to the policy enforcement function PEF conforming to the network technology.

If an action parameter is given in the form of maximum band (Mbps), the conversion rule, e.g., an ATM-technology adaptation conversion rule, makes a conversion to the ATM cell rate (cell/s). More specifically, if the network technology is ATM, then it is necessary to convert a datagram from the user accommodated by the IP network to ATM cells. It is required that the band be reserved by the ATM layer taking into consideration (1) the requested maximum band (Mbps) of the datagram, (2) a band required for an AAL header/footer, and (3) a band for sending and receiving OAM cells. By describing and setting the band necessary for the ATM-technology adaptation conversion rule, the requested maximum band (Mbps) in the IP network is converted to a peak cell rate (cell/s) in ATM-cell units. That is, the ATM-technology adaptation conversion rule converts the requested maximum band (Mbps) to the peak cell rate (PCR) and converts the minimum guaranteed band (Mbps) to the minimum cell rate (MCR).

The adaptation conversion rule also performs a conversion of service category (quality class). For example, if service categories contained in extracted policy information are full, partial guarantee and best effort, then these are converted to CBR (constant bit rate), GFR (guaranteed frame rate) and UBR (unspecified bit rate), respectively. The CBR is a quality class which guarantees a fixed-rate band reported from the user, the GFR is a quality class which guarantees a partial band (e.g., a minimum rate), and the UBR is a quality class that does not allocate a necessary band in advance. According to this class, a cell is transferred if a band becomes vacant during transfer and overflow cells are discarded if there is no vacancy.

(c) Policy enforcement function PEF

Each policy enforcement function PEF provided for a corresponding network technology (ATM, SDH, WDM, etc.) has (1) a policy enforcement unit 121, (2) an element-dependent rule handler 122, and (3) a storage unit 123 which store a number of conversion rules 123a~123n for converting technology-dependent parameters to parameters that are dependent upon the type of network element. Upon receiving a technology-dependent parameter from the policy administration function PAF, the policy enforcement unit 121 inputs the parameter to the element-dependent rule handler 122. The latter selects a conversion rule conforming to the type of element and converts the technology-dependent parameter to an element-dependent parameter using the selected conversion rule. The policy enforcement unit 121 sets the element-dependent parameter in the network element and enforces the policy.

(d) Conversion to technology-dependent parameter

With regard to the policy administration function PAF, the conversion-rule storage unit 113 stores the conversion rules 113a ~113n according to technology type and the technology-dependent rule handler 112 selects a conversion rule based upon the technology which implements the network and converts an action parameter to a technology-dependent parameter using the selected conversion rule.

Further, the conversion-rule storage unit 113 in the policy administration function PAF stores the following, on a per-network-technology basis, as conversion rules for converting action parameters to technology-dependent parameters:

(1) a first parameter conversion rule ARL relating to adaptation;

(2) a second parameter conversion rule MRL relating to monitoring; and (3) a third parameter conversion rule PRL relating to protection.

The first parameter conversion rule ARL is for converting a requested band or service category (quality class) to a technology-dependent parameter. The second parameter conversion rule MRL is for converting a monitor request to a technology-dependent parameter. The third parameter conversion rule PRL is for converting a duplex switching request to a technology-dependent parameter. The policy disassembling unit 111 disassembles an action parameter into the following parameters:

(1) a parameter (band, service category, etc.) relating to adaptation;

(2) a parameter relating to monitoring (namely whether or not continuity is monitored); and (3) a parameter relating to protection (namely whether or not a duplex switching is performed). The technology-dependent rule handler 112 applies the first to third parameter conversion rules to the respective parameters to make the conversion to the technology-dependent parameters.

(e) Utilization of Past Results of Conversion

Figure 4:
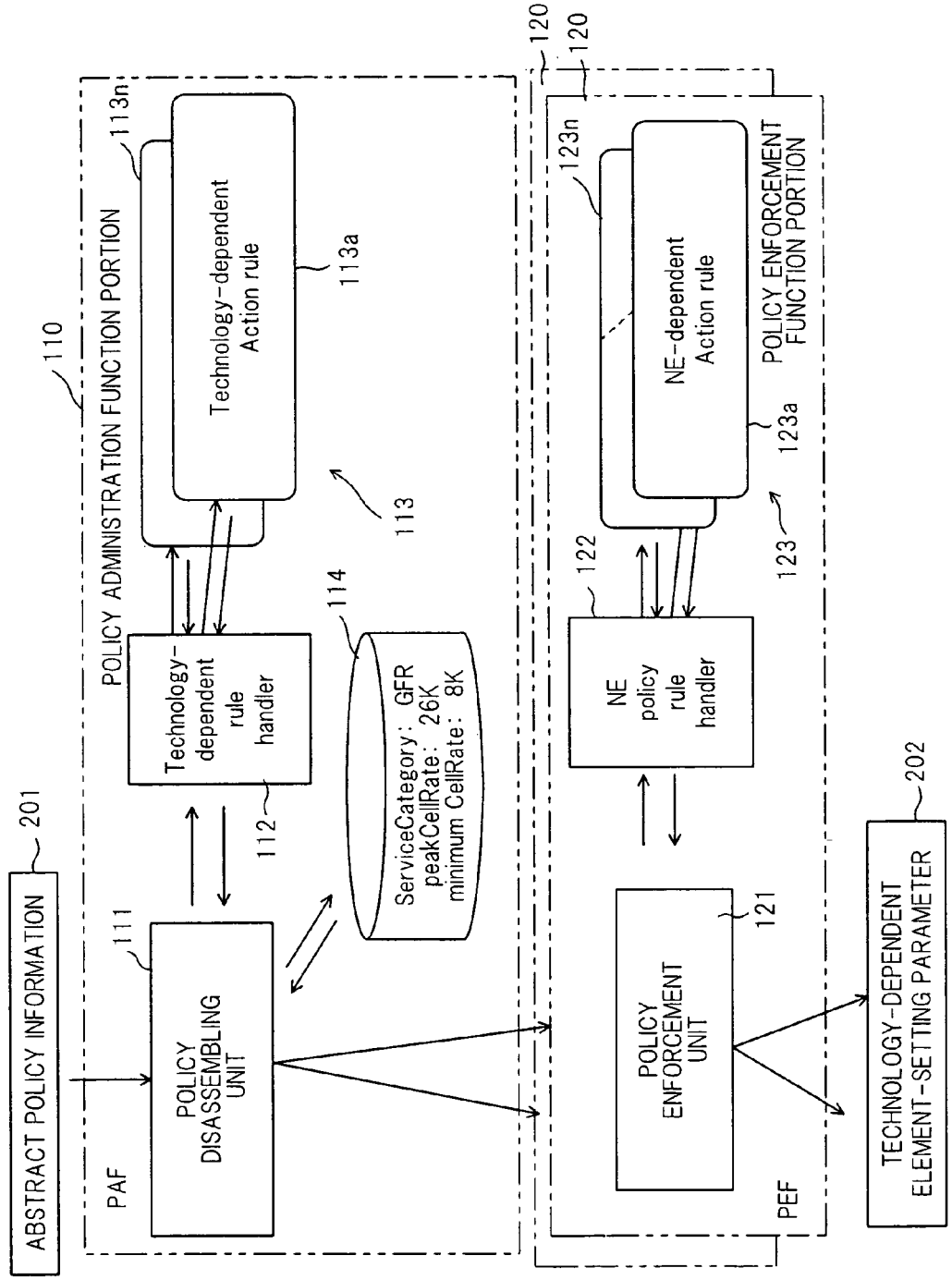
FIG. 4 is a block diagram illustrating the construction of a policy detailing function which utilizes past results of conversion.

The policy administration function PAF is provided with a policy storing memory 114, as shown in FIG. 4. Technology-dependent parameters obtained by the technology-dependent rule handler 112 are saved in this memory on a per-end-to-end basis. (1) If the policy administration function PAF receives policy information which includes a partial operation change (e.g., an increase in maximum band) end to end, (2) the policy administration function PAF converts only the action parameter contained in the policy information using a conversion rule, (3) reads an end-to-end parameter (quality class, peak cell rate PCR, minimum cell rate MCR) out of the policy storing memory 114, and (4) reconstructs a new action command by changing the read-out parameter by the parameter obtained by the conversion and delivers this command to the policy enforcement function PEF.

For example, assume that
service category: GFR
peak cell rate: 26 Kcell/s
minimum cell rate: 8 Kcell/s have been stored in the policy storing memory 114 by policy information which sets a path having a maximum band of 10 Mbps and a minimum band of 3 Mbps for a prescribed end to end. If under these conditions the policy administration function PAF receives, from the network management system NMS, abstracted policy information which includes a request to change the end-to-end maximum rate to 20 Mbps, it is required that the policy administration function PAF convert the maximum rate to the peak cell rate dependent upon ATM technology and attach the quality class and minimum cell rate to the peak cell rate that has been obtained, thereby reconstructing the action command. The policy administration function PAF therefore converts the maximum rate of 20 Mbps to an ATM peak cell rate of 52 Mbps using the ATM adaptation conversion rule. Next, the stored parameter mentioned above is read out of the policy storing memory 114 and the peak cell rate of 52 Kcell/s obtained by the conversion is substituted for the peak cell rate of 26 Kcell/s to thereby generate a new parameter indicated by the following:

service category: GFR
peak cell rate: 52 Kcell/s
minimum cell rate: 8 Kcell/s

The policy administration function PAF then creates an action command using this parameter and delivers the command to the policy enforcement function PEF.

If the arrangement described above is adopted, the system is made easier for the user to operate because it suffices to specify only the action that requires to be changed. Further, the desired technology-dependent parameters can be obtained in a short period of time merely by using a conversion rule to convert the action that requires to be changed and replacing some of the action parameters read out of the policy retaining memory with the parameters obtained by the conversion.

(f) Parameter conversion conforming to element type

In an actual network implemented in ATM, the network includes the unit (AAL) 101 having the ATM adaptation function, the units (vpTP) 103, 105 having the VP cross-connection function, and the units (vcTP) 102, 106 having the VC cross-connection function. As a consequence, it is necessary to convert technology-dependent parameters to parameters dependent upon the communication device that is to be set.

Figure 5:
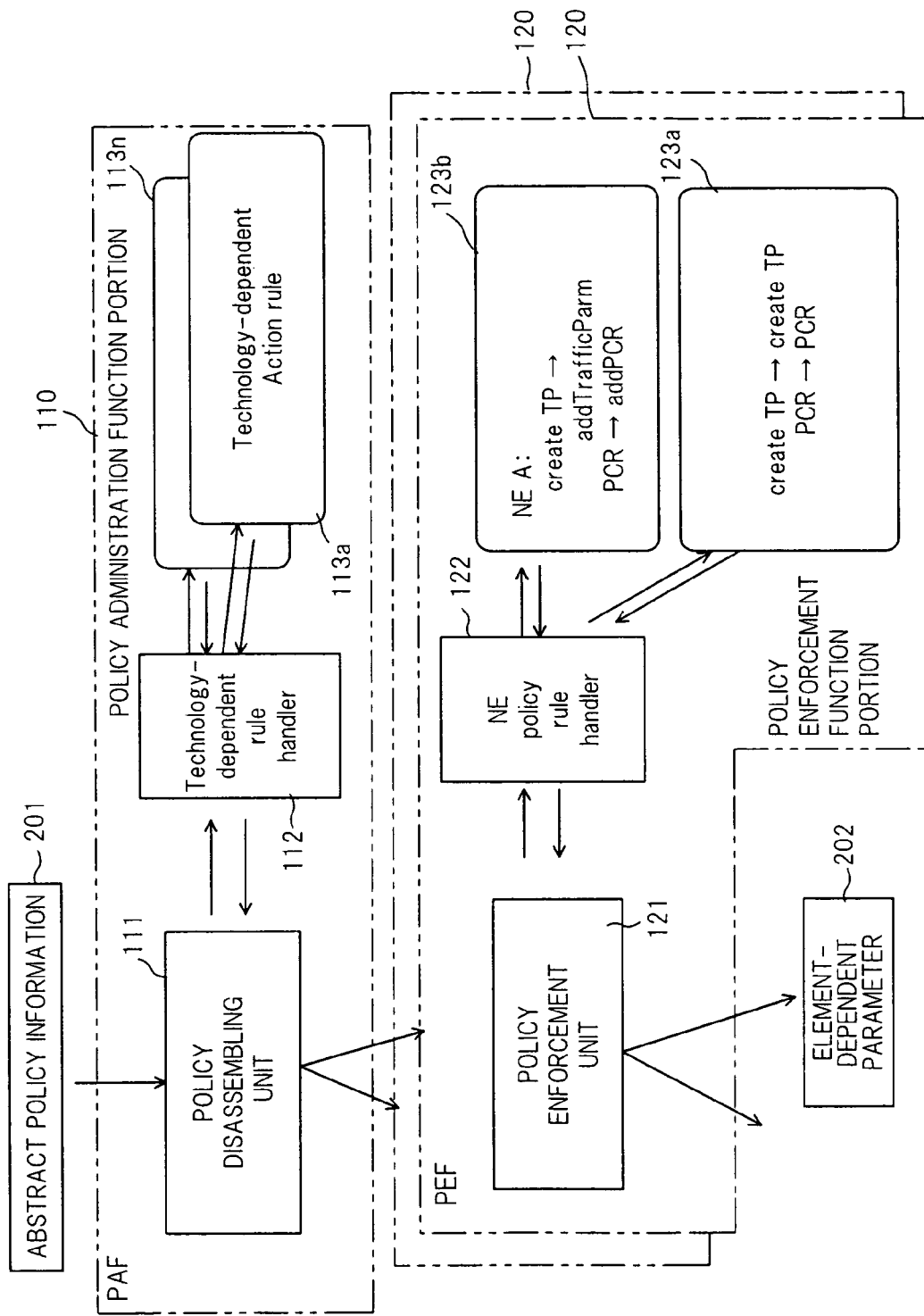
FIG. 5 is a diagram useful in describing a conversion to element-dependent parameters.

FIG. 5 is a diagram useful in describing conversion to element-dependent parameters. This is an explanatory view of VC provisioning, e.g., a case where the peak cell rate PCR of a VC cross-connection unit is increased by 26 K. Upon receiving a VC-generation action command in element units from the policy administration function PAF, the policy enforcement unit 121 sends this command to the element-dependent rule handler 122. The element-dependent rule handler 122 selects the action conversion rule 123a for VC if the network element to be set is an element having the VC cross-connection function, selects the action conversion rule 123b for VP if the network element to be set is an element having the VP cross-connection function, and converts the technology-dependent parameter to the element-dependent parameter using the action conversion rule selected.

For example, if the network element to be set is a VC cross-connection element, the action command is not changed (command operation createTP ǂcreateTP, PCR 26 K ǂPCR 26 K). Further, if the network element to be set is a VP cross-connection element, the action command is changed to an action for increasing the band of the VP cross-connection in accordance with the action conversion rule 123b for VP (createTP ǂaddTrafficParameter, PCR ǂaddPCR).

The policy enforcement unit 121 accepts the converted action parameter dependent upon the network element from the element-dependent rule handler 122 and sets this parameter in the above-mentioned element. In actuality, the policy enforcement unit 121 performs an operation to change the attribute (maximum band) of a managed object corresponding to the network element to be set, this element being managed by the element management systems EMS. As a result, the NE-configuration manager (FIG. 1) subsequently sets the changed maximum band in the network element to be set.

(g) Parameter conversion conforming to function supported by network element

In an actual system, there are many cases in which even though it is possible for quality classes such as CBR, GFR and UBR to be supported, initially only CBR is supported and quality classes to be supported are added on successively as by adding on hardware and upgrading the version of software. In an actual network system, there are many cases where upgrading the version of a function is not performed for all elements at a stroke but sequentially, as a result of which the quality classes supported by the elements differ. Accordingly, the policy enforcement function PEF adds on a rule for every addition/change of an element function, selects a prescribed conversion rule upon taking into account the function or number of versions of the network element to be changed, and converts technology-dependent parameters to element-dependent parameters using the selected conversion rule.

Figure 6:
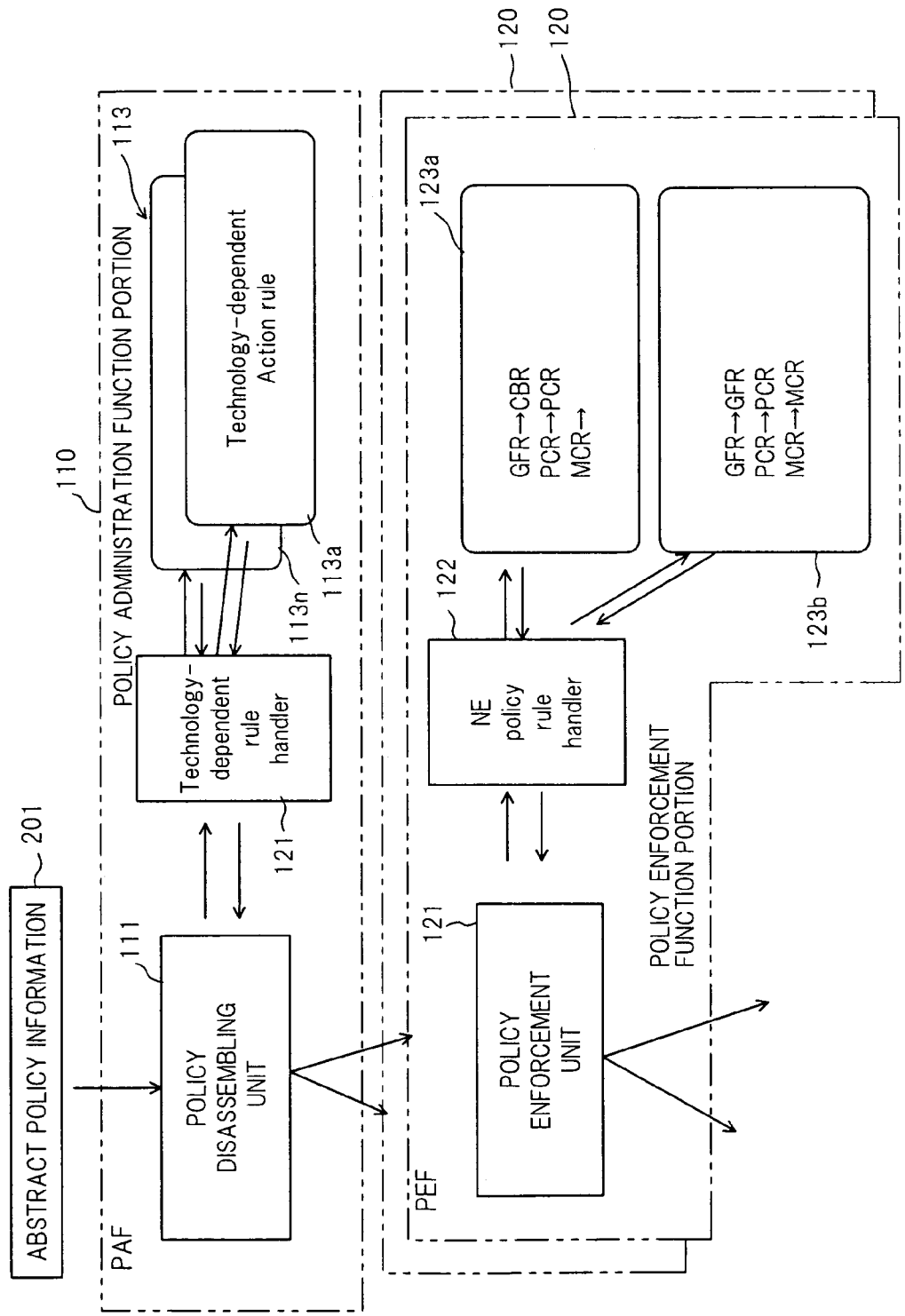
FIG. 6 is a diagram useful in describing conversion to parameters conforming to a function supported by an element.

FIG. 6 is a diagram useful in describing a parameter conversion conforming to a supported function. This is an explanatory view in a case where the quality glass GFR has been requested in VC provisioning. It is assumed here that the network includes a mixture of elements that do and do not support the quality class GFR.

Upon receiving a VC-generation action in element units from the policy administration function PAF, the policy enforcement unit 121 sends this command to the element-dependent rule handler 122. The element-dependent rule handler 122 selects a conversion rule conforming to the number of versions of the element to be set and converts the action parameter (quality class). For example, if the element to be set is an element that does not support the GFR, the element-dependent rule handler 122 selects the action conversion rule 123a, changes the quality class GFR (partial band guarantee) to CBR (full band guarantee) in accordance with this action conversion rule and deletes the minimum band MCR (minimum cell rate). On the other hand, if the element to be set is one which supports GFR, then the element-dependent rule handler 122 selects the action conversion rule 123b and executes conversion processing in accordance with this function conversion rule. It should be noted that if the element is one which supports GFR, quality class, maximum band and minimum band are not changed.

The policy enforcement unit 121 accepts the converted action parameter dependent upon the function supported by the element from the element-dependent rule handler 122 and sets this parameter in the network element.

(C) Processing of policy administration function

Figure 7:
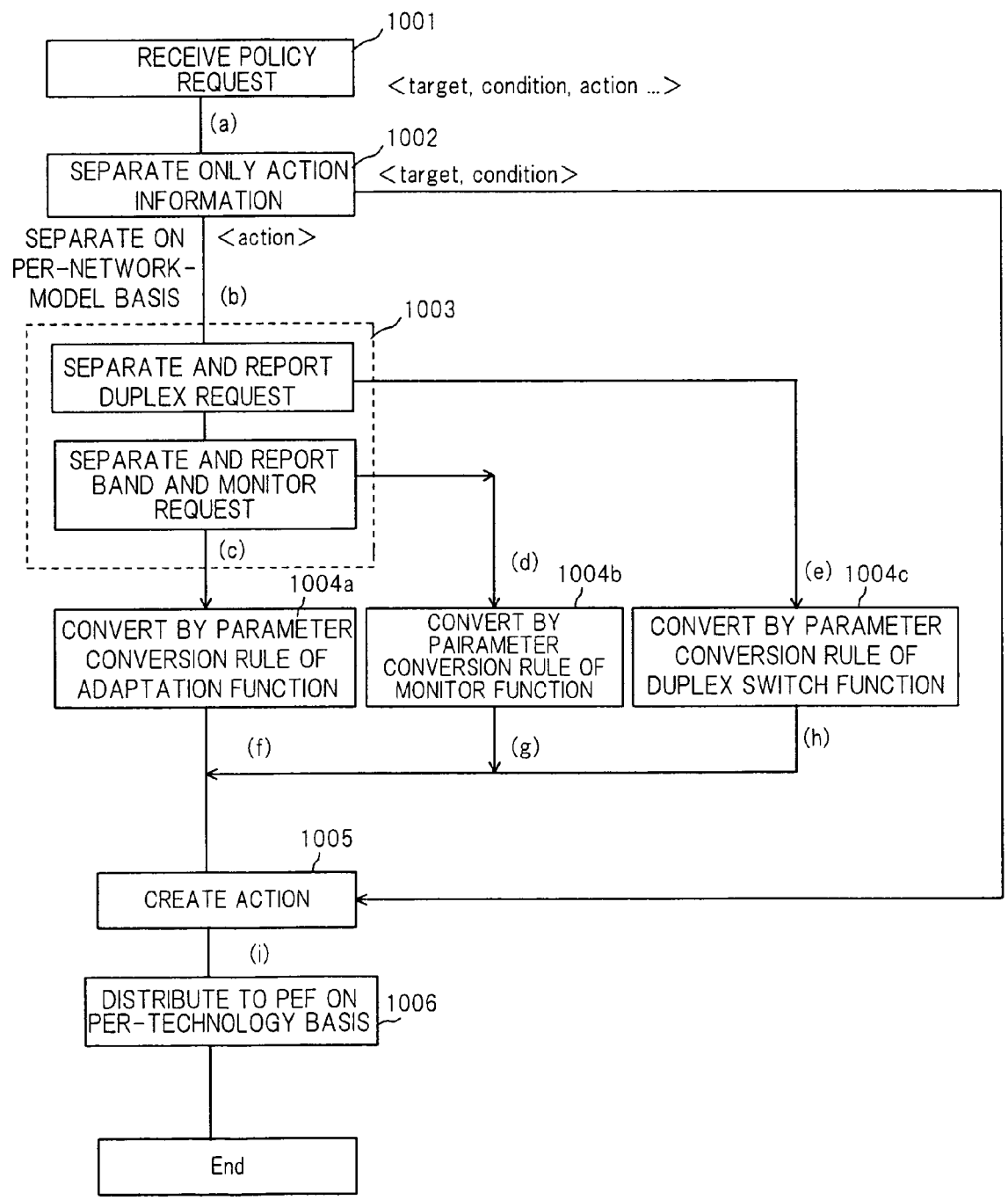
FIG. 7 is a flowchart showing the operation of a policy administration function PAF.

FIG. 7 is a flowchart showing the operation of the policy administration function PAF.

The network management system NMS inputs policy information, which includes the execution location, execution conditions and execution content of an operation, to the policy administration function PAF domain by domain in the following format:

<target, condition, action 1, action 2>

If the policy disassembling unit 111 (FIG. 3) of the policy administration function PAF receives a policy request regarding a prescribed network technology (step 1001), the policy disassembling unit 111 separates the action contents action 1, action 2, . . . from the third item onward demarcated by the commas (step 1002). Next, on the basis of the three function types, namely the adaptation function, monitor function and protection function, of common model of the network, the policy disassembling unit 111 further separates the separated action contents into a band request, monitor request and duplexing switch request (step 1003). In the case of ATM, the functions of the three types mentioned above are a function for a conversion to an ATM layer, an ATM VC/CP monitor function and a duplexing switch function. Upon adding on technology identification data, the policy disassembling unit 111 delivers the action parameters separated into the three types (band request, monitoring request and duplexing switch request) to the rule handler 112 and requests a conversion.

Using the three types of conversion rules conforming to technology indicated by the identification data, namely (1) the parameter conversion rule ARL of the adaptation function, (2) the parameter conversion rule MRL of the monitor function and (3) the parameter conversion rule of the protection function, the rule handler 112 converts the reported band request, monitor request and duplexing switch request to respective technology-dependent parameters and reports these to the policy disassembling unit 111 (steps 1004a, 1004b, 1004c). Though the three types of conversions are performed simultaneously in FIG. 7, the conversion processing can be executed in successive fashion.

The policy disassembling unit 111 creates an action command based upon the technology-dependent parameter obtained by the conversion (step 1005) for every terminal indicated by target information (element information), which has been separated at step S1002, and delivers this action command to the policy enforcement function PEF that conforms to the network technology (step 1006). The policy enforcement function PEF then converts the technology-dependent parameter to an element-dependent parameter conforming to the element type.

FIGS. 8A~8I are diagrams (in case of ATM) useful in describing data in various parts (a)~(i) of the operation flowchart of the PAF. FIG. 8A is abstracted policy information reported from the network management system NMS. The following is specified by this policy information: "In communication from terminal TPa to terminal TPb from time 9:00 to 18:00, a maximum rate of 10 Mbps and a minimum guaranteed rate of 3 Mbps serves as the requested band, continuity monitor serves as the monitor request, and duplex is designated as the duplexing switch request".

FIG. 8B are action parameters that have been separated from the policy information and include the maximum rate 10 Mbps, the minimum rate 3 Mbps, continuity monitor and duplex. FIGS. 8C to 8E are the results of further converting the above-described action parameters to the three types of parameters of band request, monitor request and duplex switch request, in which FIG. 8D is the band request (maximum rate of 10 Mbps, minimum rate of 3 Mbps), FIG. 8D the monitor request (continuity monitor) and FIG. 8E is the duplex switch request (duplex).

FIGS. 8F to 8H illustrate technology-dependent parameters obtained by converting each of the requests to ATM parameters using conversion rules. The adaptation conversion rule converts the band request (maximum rate of 10 Mbps, minimum rate of 3 Mbps) to the ATM peak cell rate of 26,000 cell/s, minimum cell rate of 8,000 cell/s and ATM service category GFR of the minimum guarantee (see FIG. 8F). The monitor request conversion rule converts the monitor request (continuity monitor) to "test type: VC continuity test, OAM cell rate: 20 cell/s, test mode: in-service" (see FIG. 8G). The protection conversion rule converts the duplex switching request (duplex) to "switch type: VP protection, pair group number: 10" (step 8H).

FIG. 8I is an action command delivered to the policy enforcement function PEF. The policy disassembling unit 111 refers to the target information (From: TPa To: TPz) and generates two action commands at terminals TPa and TPz with regard to technology-dependent parameters obtained by respective conversion rules. For example, the policy disassembling unit 111 generates an action command that includes converted parameters (peak cell rate of 26,000 cell/s, minimum cell rate of 8,000 cell/s, service category GFR), which are for setting the band, and the terminal TPa, and an action command that includes the converted parameters for setting the band and the terminal TPz. The generated action commands are set in ATM communication device through the policy enforcement function PEF for ATM.

Figure 10:
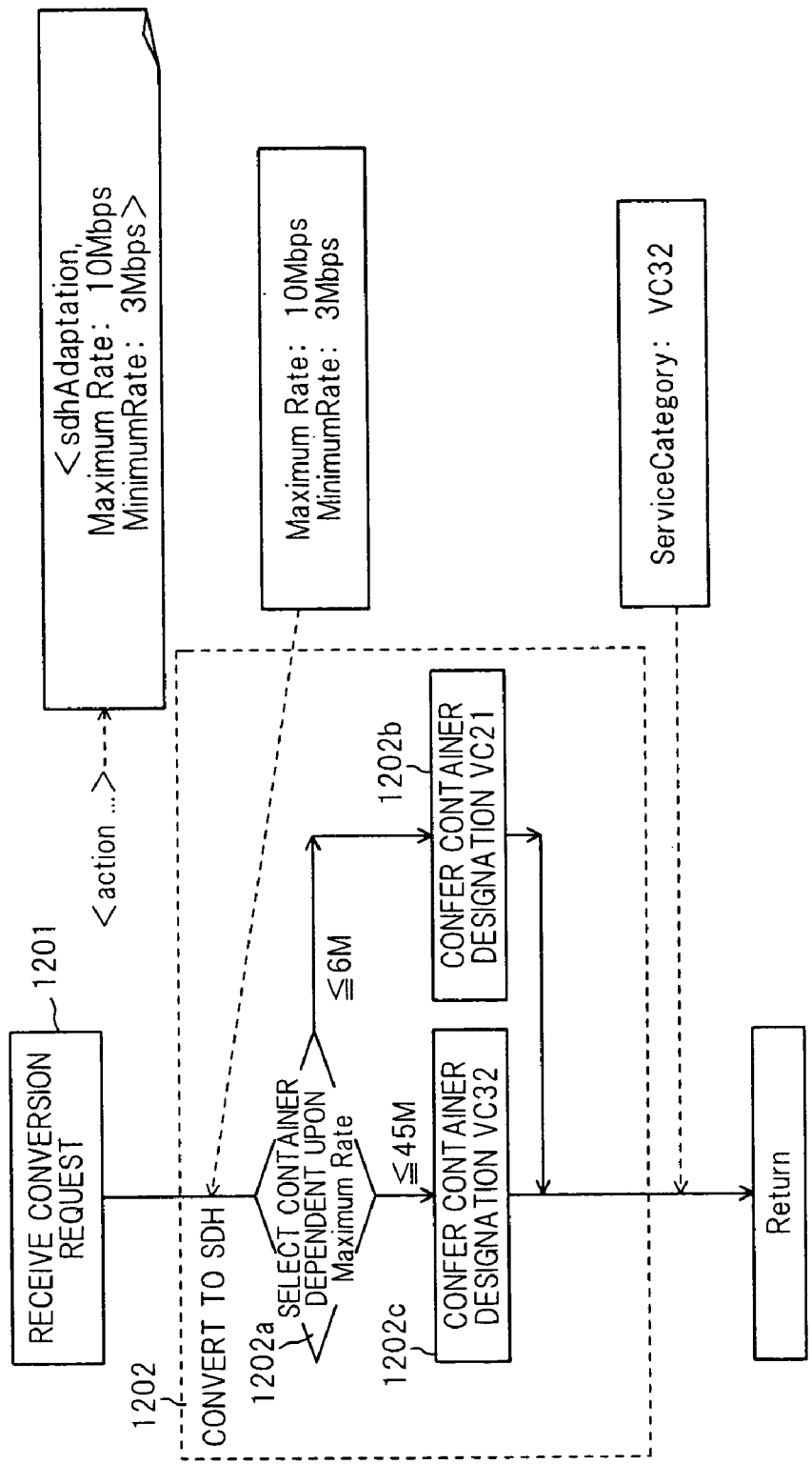
FIG. 10 is a processing flowchart (in the case of an SDH) of an action conversion rule of the PAF.

FIGS. 9 and 10 are processing flowcharts of the adaptation conversion rule ARL for converting the band request, in which FIG. 9 is the processing flowchart of an adaptation conversion rule in ATM technology and FIG. 10 is the processing flowchart of an adaptation conversion rule in SDH technology.

In FIG. 9, if the rule handler 112 (FIG. 3) receives the maximum rate of 10 Mbps and the minimum rate of 3 Mbps as the action parameters of ATM technology from the policy disassembling unit 111 (step 1101), the rule handler 112 thenceforth converts these parameters to parameters dependent upon the ATM technology using the adaptation conversion rule of ATM technology.

To make a conversion to an ATM parameter, it is necessary to increase the rate by an amount equivalent to the header (footer), which is inserted into the ATM payload, and the ATM cell header. The length of the header inserted into a payload PDO is 4 bytes per 44 bytes in case of the ATM 3/4 type. The rate, therefore, is increased by 9%. More specifically, if the requested rate is X (bps), then a rate of X×(48/44) (bps) is necessary to insert the header and footer. Further, it is necessary to increase the band by 5 bytes per 48 bytes as the ATM cell header, and therefore it is required that the rate be increased further by a factor of 53/48. More specifically, if a rate of X (bps) is requested, then, with ATM technology, a total of X×(48/44)×(53/48) (bps) is required. If this is converted to cell rate (one cell is 53×8 bits), then the required band will be

[X×(48/44)×(53/48)]/(53×8) (cell/s)

Accordingly, the cell handler 112 calculates the ATM cell rate using the above-cited formula (step 1102). As a result, a peak cell rate of 26 Kcell/s and a minimum cell rate of 8 Kcell/s are obtained. It should be noted that it is necessary to take the OAM cell into consideration as well.

Next, the rule handler 112 adds on the service category (step 1103). In the case of ATM, the quality is clearly identified and set in the ATM communication device. If the minimum rate is guaranteed, GFR (Guaranteed Frame Rate) is set. Accordingly, it is determined from the policy information whether a minimum rate has been requested (step 1103a). If the answer is "YES", then GFR is added on as the ATM service category (step 1103b). If only the peak rate has been requested, CBR is added on (step 1103b).

The rule handler 112 answers the policy disassembling unit 111 with the ATM service category, peak cell rate and minimum cell rate obtained by the processing described above.

The foregoing is for implementation in ATM. In case of implementation in SDH, as shown in FIG. 10, the rule handler 112 receives the maximum rate of 10 Mbps and the minimum rate of 3 Mbps as the SDH-technology action parameters from the policy disassembling unit 111 (step 1201). Next, the rule handler 112 converts these parameters to parameters dependent upon the SDH technology using the SDH-technology adaptation conversion rule.

In case of SDH implementation, the user decides beforehand that 6 M and 45 M are the bands used. Accordingly, the SDH-technology adaptation conversion rule decides the band of SDH upon taking the requested maximum band (10 Mbps) into consideration (step 1202). That is, it is determined whether the maximum band is equal to or less than 6 M or between 6 M and 45 M (step 1202a). If the maximum band is equal to or less than 6 M, then a VC21 container is selected as the service category (step 1202b). If the maximum band is between 6 M and 45 M, then a VC32 container is selected as the service category (step 1202c). The selected service category is sent to the policy disassembling unit 111 as the answer.

FIGS. 11A, 11B show examples in which a monitor request monitor: continuityMonitor has been converted by a monitor-related conversion rule, in which FIG. 11A shows ATM-technology-dependent parameters after conversion and FIG. 11B shows SDH-technology-dependent parameters after conversion.

In case of a continuity-monitor request, it is converted to a VC characteristic test parameter, as shown in FIG. 11A, in the ATM implementation. In the case of the SDH implementation, if a path-trace function of a virtual container is used as substitution means of an in-service test, the parameter dependent upon the SDH technology will be as follows, as illustrated in FIG. 11B:

TestCategory: SDH PathTrace

FIGS. 11C, 11D show examples in which a duplex request

Protection: Duplex has been converted by a protection-related conversion rule, in which FIG. 11C shows ATM-technology-dependent parameters after conversion and FIG. 11D shows SDH-technology-dependent parameters after conversion. In case of the duplex request, a conversion is made to a VP protection parameter, as shown in FIG. 11C, in the ATM implementation. In the case of path changeover, it is required that the working and protection pair be managed and, hence, a changeover management number (pair group number) is added on. In the case of the SDH implementation, the parameter dependent upon the SDH technology will be as follows, as illustrated in FIG. 11D:

protectionCategory: SDHprotection

If only the SDH-section switch function is supported, working/protection is fixedly allocated within the SDH device. A changeover management number, therefore, is unnecessary.

(D) Processing of Policy Enforcement Function

Figure 12:
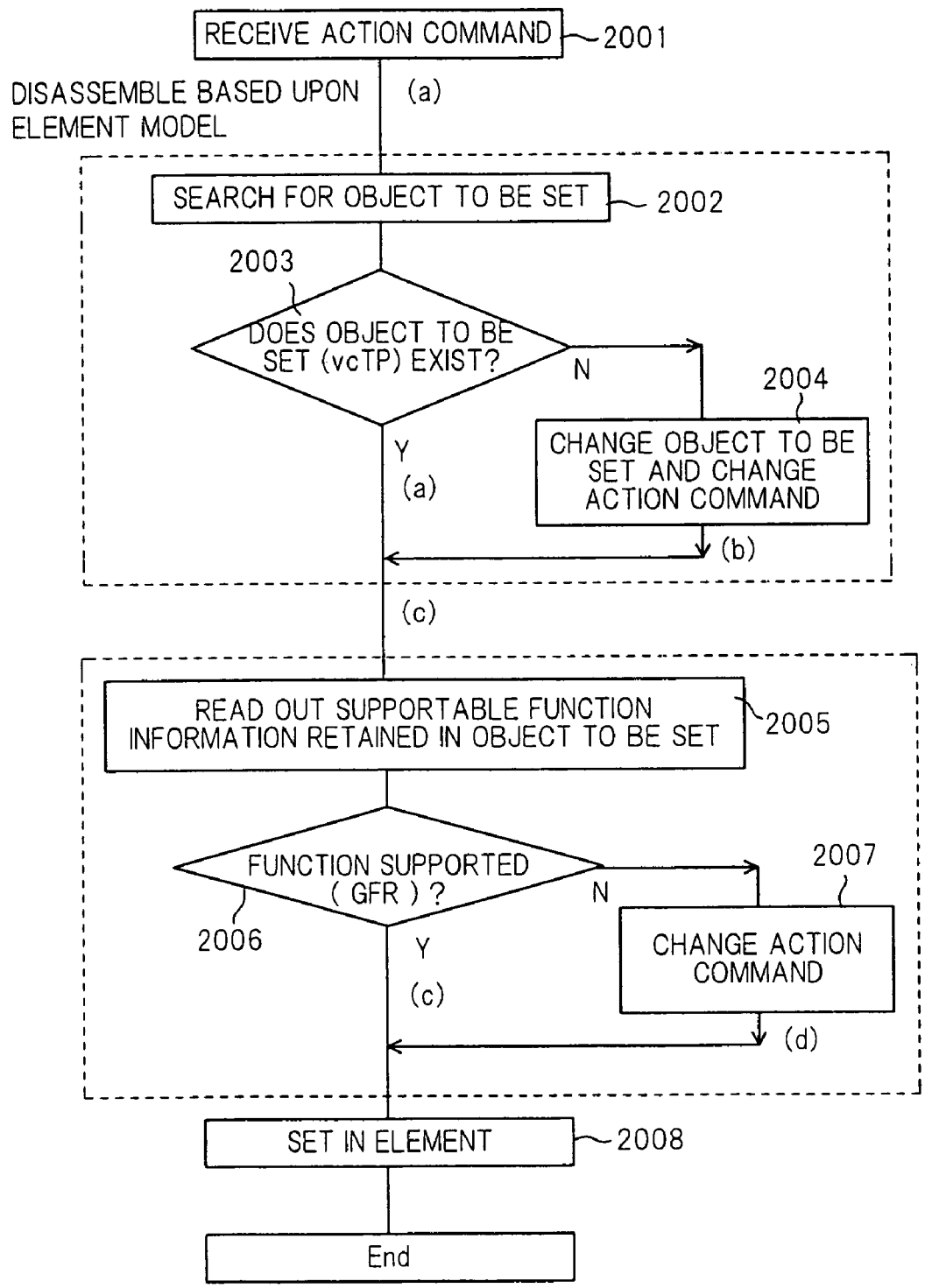
FIG. 12 is a processing flowchart of a policy enforcement function PEF.

FIG. 12 is a flowchart illustrating the operation of the policy enforcement function PEF.

The policy administration function PAF inputs an action command (FIG. 8I), which includes the function name, execution location (vcTP-ID) and execution content, to the policy enforcement function PEF.

The policy enforcement unit 121 (FIG. 3) of the policy enforcement function PEF accepts the action command on a per-element basis (step 2001) and delivers the function to the rule handler 122.

Upon receiving the action command, the rule handler 122 refers to the element model within the element management system EMSi to determine whether the action is actually capable of being set. If the action can be set, then the rule handler 122 sets the action. In a case where a change is necessary, the rule handler 122 changes the action command. That is, the rule handler 122 searches for a managed object within the element management system EMSi (step 2002) and checks to see whether an execution location (object to be set) exists (step 2003).

If an object to be set does not exist, the rule handler 122 searches for a substitutable object to be set and, if one is found, calls a conversion rule and converts the action command to an action command with regard to the substitutable object to be set (step 2004). If an object to be set exists in the managed object, the action command is not changed.

Next, the rule handler 122 determines whether the command can actually be executed. More specifically, the rule handler 122 reads the function information held by the object to be set out of the managed object (step 2005) and determines whether the function stipulated by the action command is supported (step 2006). If the function is not supported, the rule handler 122 calls a conversion rule and effects a conversion to a substitute action command (step 2007). If the function is supported, it is unnecessary to change the action command.

Finally, the rule handler 122 delivers the action command obtained by the above-described processing to the policy enforcement unit 121 (step 2008). The policy enforcement unit 121 then sets the action command in the element.

FIGS. 13A–13D are diagrams (in case of ATM) useful in describing data in various parts (a)–(d) of the operation flowchart of the PEF. This data will be used to describe the processing of FIG. 12.

Figure 13A:
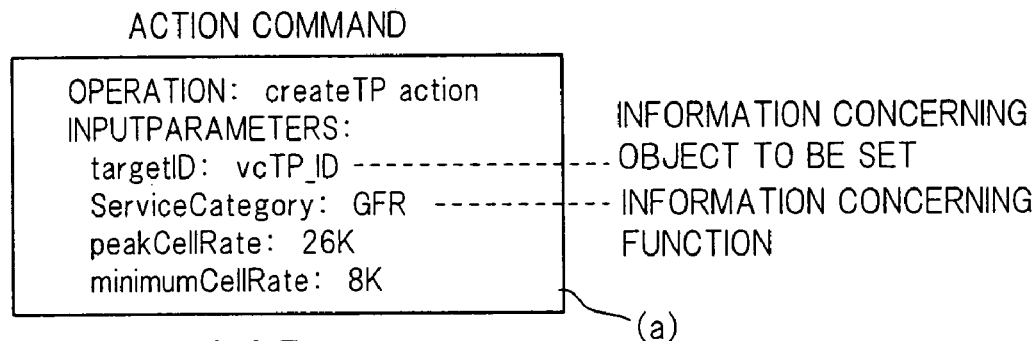
FIGS. 13A to 13D are diagrams useful in describing data in various parts of the processing flowchart of the PEF.

FIG. 13A shows a create TP action command received from the policy administration function PAF. This command generates, within an element, a vcTP that satisfies the service category GFR, peak cell rate of 26 K and minimum cell rate of 8 K.

Upon receiving the above-described action command from the policy enforcement unit 121, the rule handler 122 refers to the managed object with the EMSi and determines whether a vcTP, which is the object to be set, exists (step 2003).

Figure 13B:
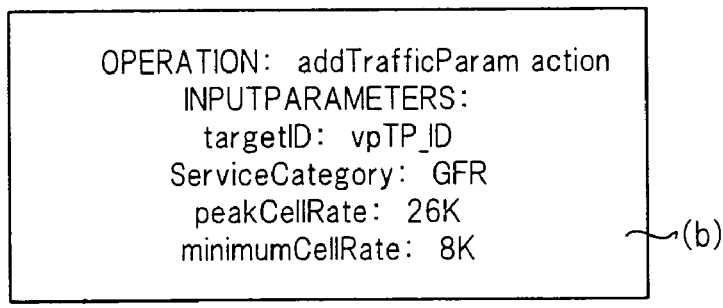

If the vcTP, which is the object of the action, exists, the action command is not changed. If an vcTP is absent, however, the rule handler 122 calls a conversion rule and changes the object to be set from vcTP to a substitutable vpTP (step 2004). FIG. 14 is a diagram useful in describing the processing of a conversion rule for changing an object to be set. The rule handler 122 changes the operation name in the action command from createTP to addTrafficParameter (step 2004a) and then changes the object to be set (target ID) from vcTP to vpTP (step 2004b). As a result, the action command is changed as illustrated in FIG. 13B. The command createTP creates the TP (termination point) of the designated band and changes the band of the existing TP to the designated band. The command addTrafficParameter increases the band of the existing TP by the amount of the designated band.

Figure 13C:
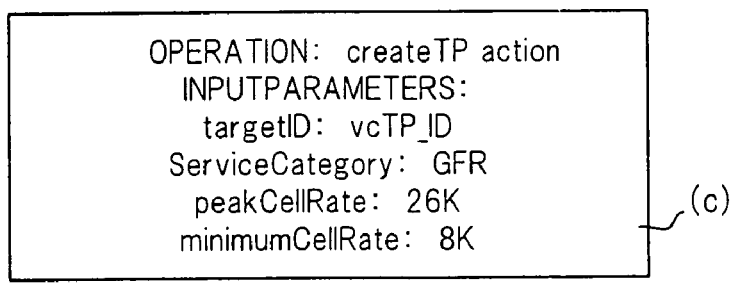
Figure 13D:
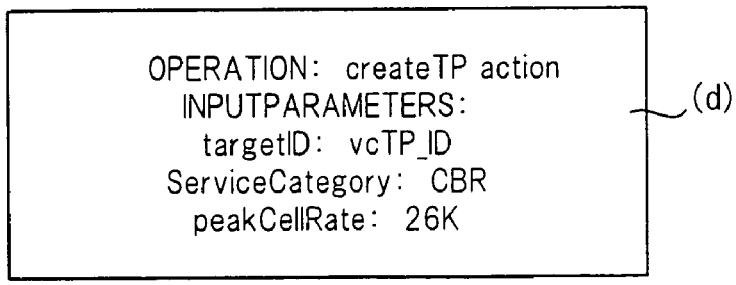
Figure 15:
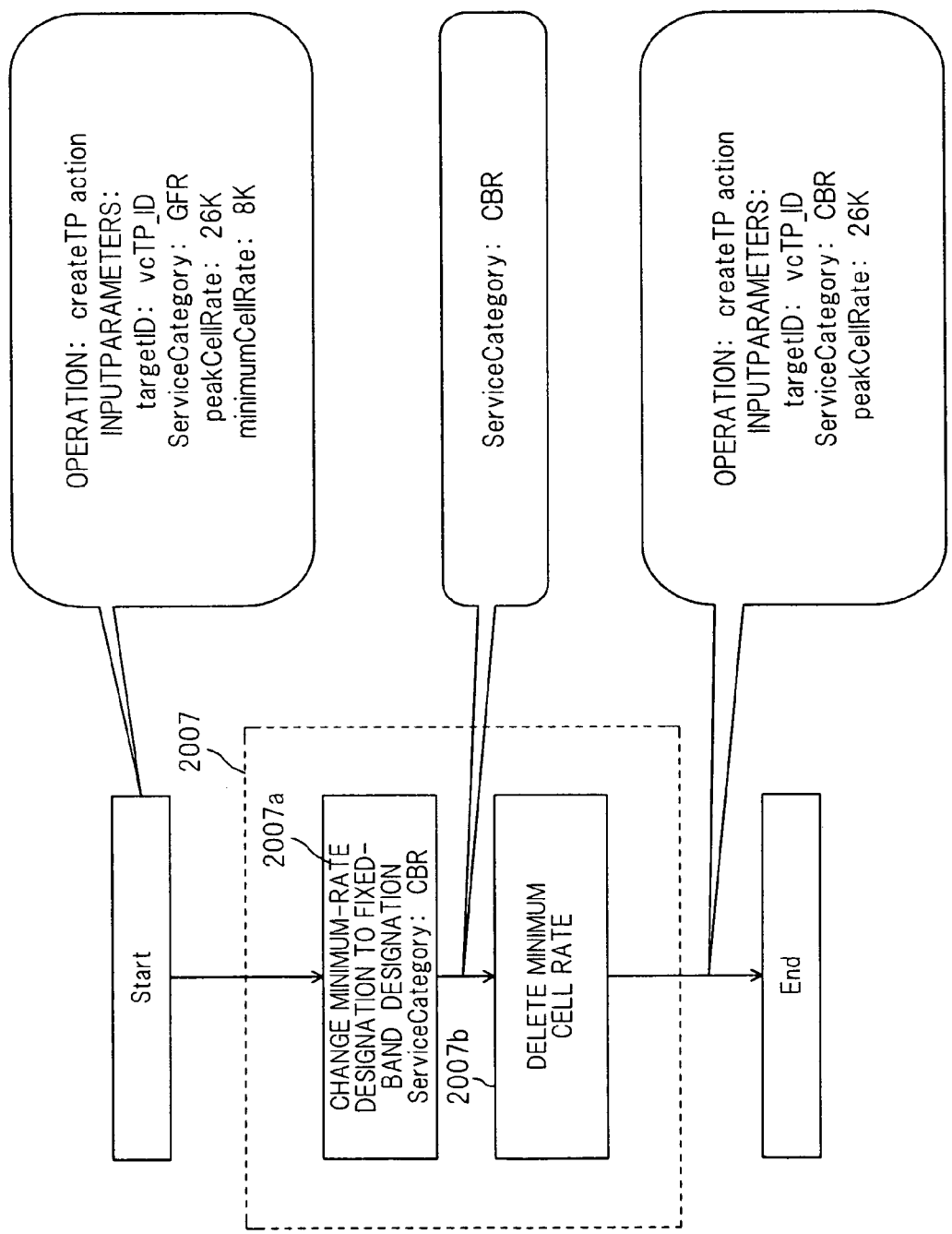
FIG. 15 is a processing flowchart of a conversion rule for changing quality class.
Figure 16:
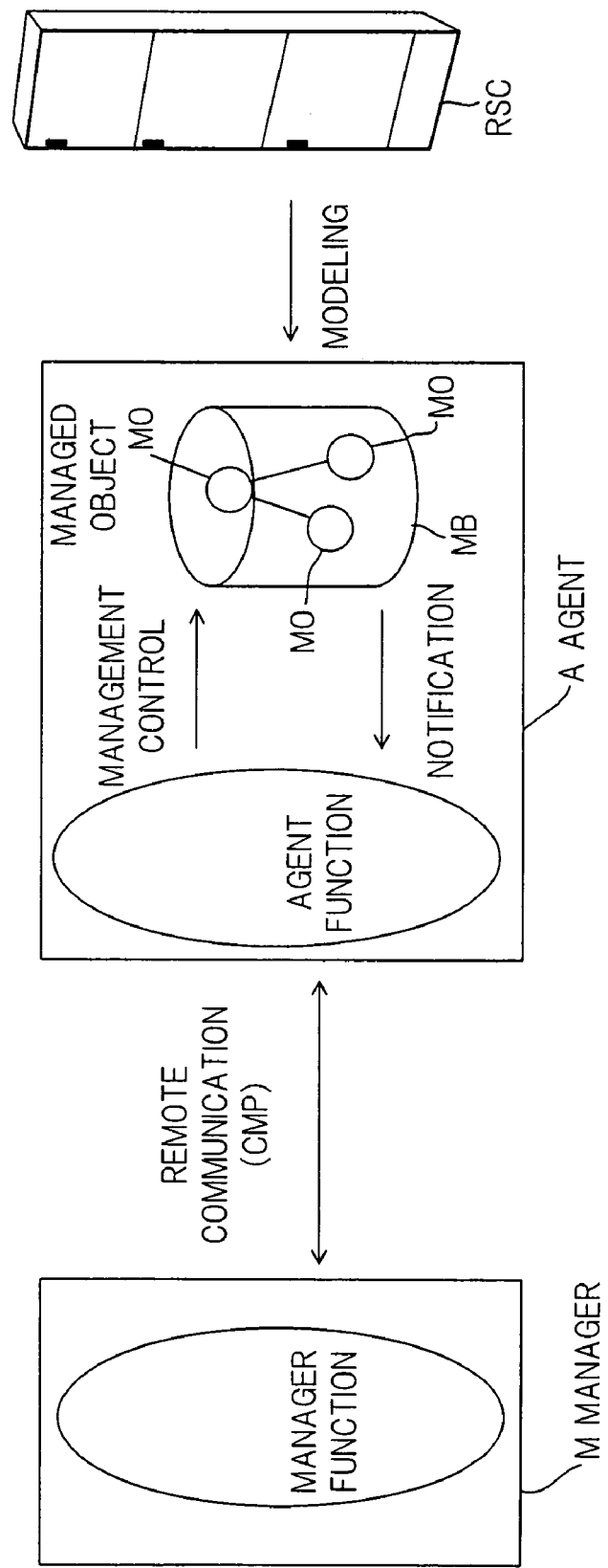
FIG. 16 is a diagram useful in describing a system management model according to the prior art.
Figure 17:
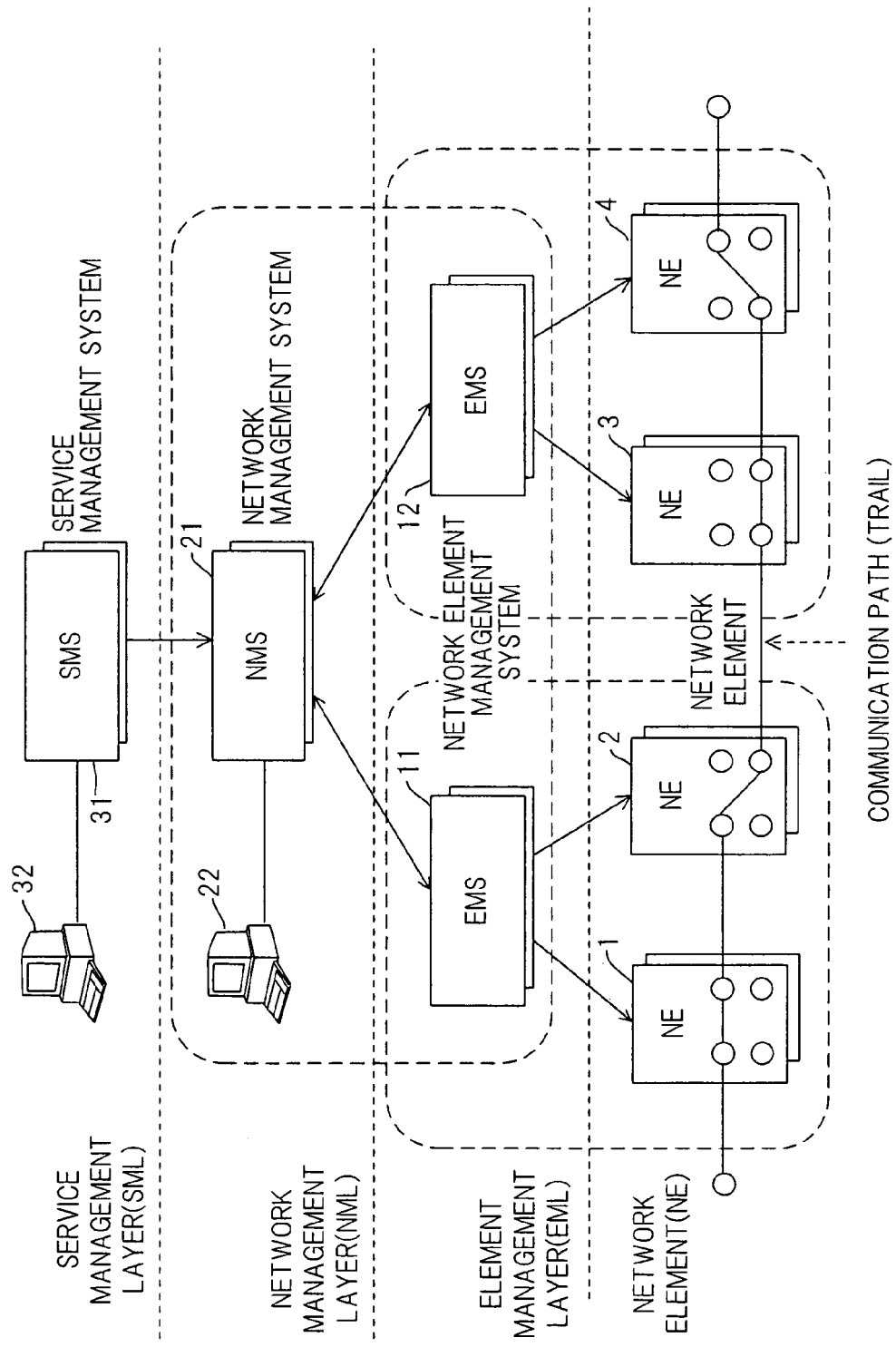
FIG. 17 is a diagram useful in describing the concept of network hierarchy according to the prior art.
Figure 18:
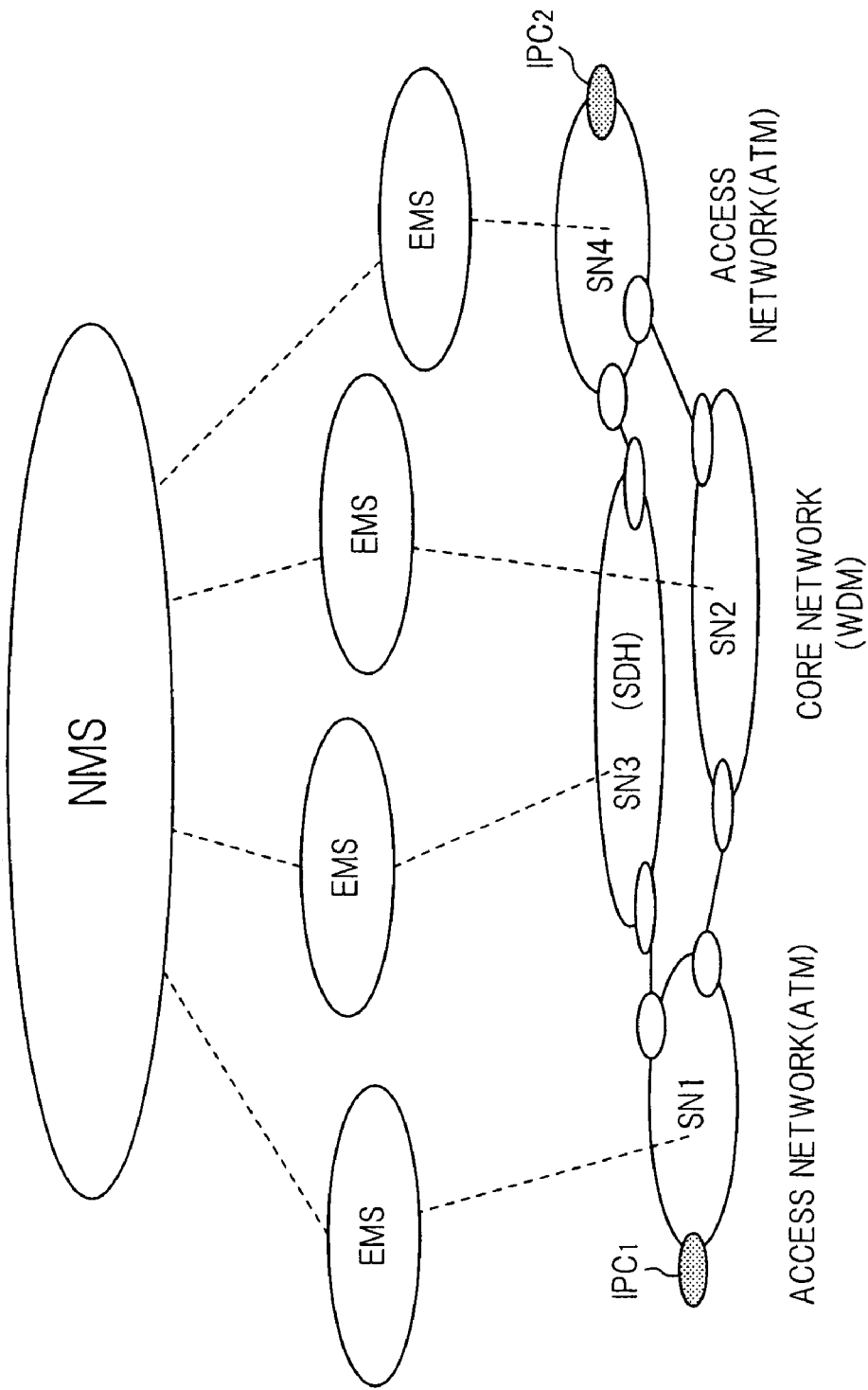
FIG. 18 is a diagram showing an example of the configuration of a communication network according to the prior art.
Figure 19:
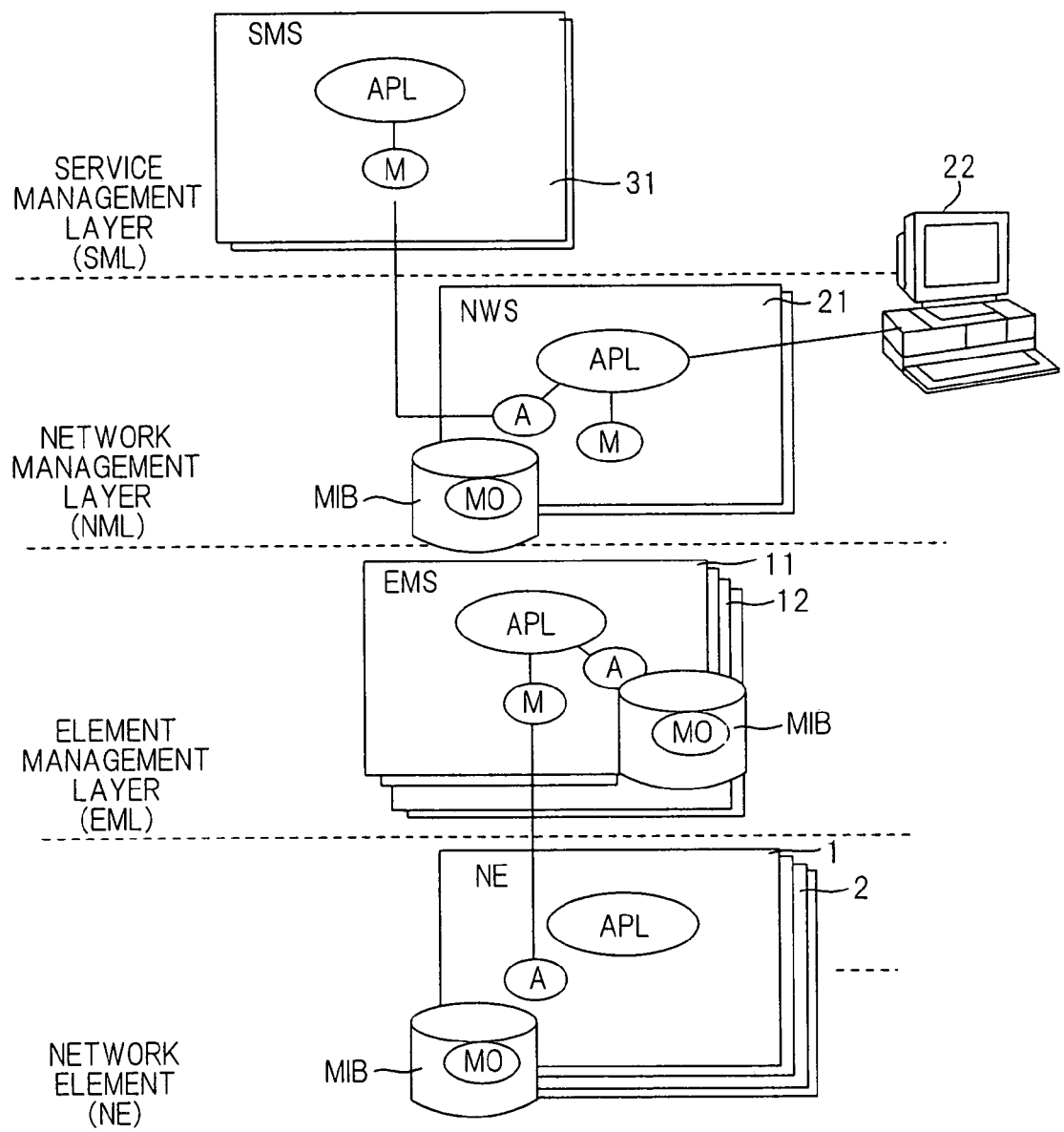
FIG. 19 is a diagram useful in describing the relationship among systems.

Next, if vcTP exists, the rule handler 122 reads quality information supported by the element out of the managed object within the element management system EMSi (step 2005). If the element does not support GFR, the rule handler 122 calls a conversion rule and changes the service category within the action command from GFR to CBR by this conversion rule (step 2007). FIG. 15 is a diagram useful in describing the processing of a conversion rule in a case where the ATM service quality supported by an element does not guarantee the minimum rate and fully guarantees only the maximum rate. The rule handler 122 changes the service category within the action command from GFR to CBR (step 2007a). Next, the rule handler 122 deletes the minimum-rate designation within the action command from the action command since this designation is unnecessary (step 2007b). As a result, the action command is changed as shown in FIGS. 13C–13D.

Finally, the rule handler 122 delivers the action command obtained by the above-described processing to the policy enforcement unit 121 and the policy enforcement unit 121 sets the action command in the element (step 2008).

Though a common policy enforcement function is provided for network technologies, one can be provided in the element management systems EMS1–EMS3 of each of the technologies.

Thus, in accordance with the present invention, as described above, policy detailing is automated. As a result, it is possible to reduce the know-how and learning necessary for network settings and to speed up and simplify network settings on the user side, and to make it possible to shorten the time necessary to change to a new service on the side of the public network, as a result of which the cost of changing a network configuration is reduced.

In accordance with the present invention, a policy detailing function is systematized. As a result, the policy detailing function can be changed and used more widely and it is easy to provide multiple values for functions and to convert functions.

In accordance with the present invention, it is so arranged that a conversion can be made automatically from the action parameter of abstracted policy information that is independent of network technology to a parameter that is dependent upon network technology. As a result, the operator of a network is capable of setting a parameter in an element merely by inputting abstracted policy information that is independent of the network.

In accordance with the present invention, a policy detailing function is separated into (1) a policy administration function provided commonly for the network technologies and (2) policy enforcement functions provided for corresponding ones of network technologies. As a result, when hardware/software is added on or updated, this can be dealt with merely by adding on a technology-dependent conversion rule of the policy enforcement function. This makes it easy to change the system.

In accordance with the present invention, (1) a conversion rule relating to adaptation, (2) a conversion rule relating to monitoring and (3) a conversion rule relating to protection are provided for dealing with respective network technologies, and an action parameter contained in abstracted policy information is separated into (1) a parameter relating to adaptation, (2) a parameter relating to monitoring and (3) a parameter relating to protection, and a prescribed parameter conversion rule is applied to each of these parameters to effect a conversion to parameters that are dependent upon network technology. This makes it possible to achieve all settings needed by the user while an increase in conversion rules is prevented.

Desired technology-dependent parameters can be obtained by storing past results of conversion (technology-dependent parameters) in a policy storing memory, converting an action which requires changing by using a conversion rule, reading action parameters out of the policy storing memory, and replacing some of the parameters that have been read out with parameters that have been obtained by the conversion. As a result, the system can be made easier for the user to operate because it suffices to specify only the action that requires to be changed.

The present invention is such that even if elements having different functions (VC-connection elements, VP-connection elements, etc.) exist in the same network technology, parameters suited to the functions of the element to be set can be set.

The present invention is such that even if elements having functions (e.g., quality class) that differ dependent upon the element version exist, parameters suited to the element version and function of a device to be set can be set.

As many apparently widely different embodiments of the present invention can be made without departing from the spirit and scope thereof, it is to be understood that the invention is not limited to the specific embodiments thereof except as defined in the appended claims.

What is claimed is:

1. A communication network system for converting action parameters contained in policy information obtained by abstracting network-related user requirements to parameters conforming to network technology and type of network element, and setting these parameters in the network element, said system comprising:

first conversion means for converting action parameters contained in the abstracted policy information to network-technology dependent parameters; and second conversion means for converting the network-technology dependent parameters to parameters dependent upon a type of network element and setting the converted network-technology dependent parameters in the network element, wherein said first conversion means includes:

policy disassembling means for disassembling the abstracted policy information, extracting the action parameters and outputting the action parameters;

conversion-rule storage means for storing conversion rules used when the action parameters are converted to network-technology-dependent parameters; and conversion means for selecting a conversion rule conforming to a network technology and converting the action parameters to network-technology-dependent parameters using the selected conversion rule.

2. The system according to claim 1, wherein said second conversion means includes:

policy enforcement means for receiving the network-technology-dependent parameters from said first conversion means and setting, in a network element, element-dependent parameters obtained by converting the network-technology-dependent parameters;

conversion-rule storage means for storing conversion rules used when the network-technology-dependent parameters are converted to element-dependent parameters; and conversion means for selecting a conversion rule conforming to type of network element and converting the network-technology-dependent parameters to element-dependent parameters using the selected conversion rule.

3. The system according to claim 2, wherein in said second conversion means:

said rule-conversion storage means stores conversion rules on a per-element-type basis; and said conversion means selects a conversion rule based upon the type of element and converts network-technology-dependent parameters to element-dependent parameters using the selected conversion rule.

4. The system according to claim 2, wherein in said second conversion means:

said conversion-rule storage means adds on a conversion rule whenever a function of a network element is added on or changed; and said conversion means selects a prescribed conversion rule upon taking the function of a network element or the number of versions of a network element into consideration, and converts the network-technology-dependent parameters to the element-dependent parameters using the selected conversion rule.

5. The system according to claim 1, wherein in said first conversion means:

said conversion-rule storage means stores conversion rules for every network technology; and said conversion means selects a conversion rule based upon a network technology and converts the action parameters to network-technology-dependent parameters using the selected conversion rule.

6. The system according to claim 5, wherein said conversion-rule storage means stores the following as conversion rules for converting the action parameters to network-technology-dependent parameters:

(1) a first parameter conversion rule relating to adaptation, (2) a second parameter conversion rule relating to monitoring, and (3) a third parameter conversion rule relating to protection;

said policy disassembling means disassembles the action parameters into (1) a parameter relating to adaptation, (2) a parameter relating to monitoring and (3) a parameter relating to protection; and said conversion means converts each of the parameters to network-technology-dependent parameters using the first to third parameter conversion rules.

7. The system according to claim 1, wherein said first conversion means has policy storing means, network-technology-dependent parameters are stored on a per-end-to-end basis in said policy storing means, and when new policy information end to end is received, network-technology-dependent parameters conforming to this policy information are created using the technology-dependent parameters that have been stored in said policy storing means.

* * * * *